United States Patent
Nam et al.

(10) Patent No.: US 11,166,169 B2
(45) Date of Patent: Nov. 2, 2021

(54) WAKEUP SIGNALING IN AN UNLICENSED RADIO FREQUENCY SPECTRUM BAND

(71) Applicant: QUALCOMM Incorporated, San Diego, CA (US)

(72) Inventors: Wooseok Nam, San Diego, CA (US); Tao Luo, San Diego, CA (US); Olufunmilola Omolade Awoniyi-Oteri, San Diego, CA (US)

(73) Assignee: QUALCOMM INCORPORATED, San Diego, CA (US)

(*) Notice: Subject to any disclaimer, the term of this patent is extended or adjusted under 35 U.S.C. 154(b) by 39 days.

(21) Appl. No.: 16/781,878

(22) Filed: Feb. 4, 2020

(65) Prior Publication Data

US 2020/0267562 A1    Aug. 20, 2020

Related U.S. Application Data

(60) Provisional application No. 62/808,224, filed on Feb. 20, 2019.

(51) Int. Cl.
*H04W 16/14* (2009.01)
*H04W 52/02* (2009.01)
*H04W 52/54* (2009.01)

(52) U.S. Cl.
CPC ....... *H04W 16/14* (2013.01); *H04W 52/0235* (2013.01); *H04W 52/54* (2013.01)

(58) Field of Classification Search
CPC ..... H04W 16/00; H04W 16/14; H04W 16/16; H04W 52/0225; H04W 52/0235;
(Continued)

(56) References Cited

U.S. PATENT DOCUMENTS

2015/0327196 A1* 11/2015 Blankenship ............. H04J 1/00
                                                          370/281
2017/0339641 A1  11/2017 Nigam et al.
(Continued)

FOREIGN PATENT DOCUMENTS

WO    WO-2018205975 A1    11/2018

OTHER PUBLICATIONS

Ericsson: "DRX Enhancement for NR-U,"3GPP Draft, 3GPP TSG-RAN WG2 #103-Bis, R2-1815027—DRX Enhancement for NR-U, 3rd Generation Partnership Project (3GPP), Mobile Competence Centre, 650, Route Des Lucioles, F-06921, Sophia-Antipolis Cedex, France, vol. RAN WG2, No. Chengdu, China; Oct. 8, 2018-Oct. 8, 2018, Sep. 27, 2018 (Sep. 27, 2018), XP051524395, 5 pages, Retrieved from the Internet:URL:http://www.3gpp.org/ftp/tsg%5Fran/WG2%5FRL2/TSGR2%5F103bis/Docs/R2%2D1815027%2Ezip [retrieved on Sep. 27, 2018] p. 2, paragraph 2.2, p. 2, line Observation 4, p. 3, line Option 2.
(Continued)

*Primary Examiner* — Warner Wong
(74) *Attorney, Agent, or Firm* — Holland & Hart LLP

(57) ABSTRACT

Methods, systems, and devices for wireless communications are described. A user equipment (UE) may transmit a signal to a base station indicating a UE capability configuration. The UE may receive, over an unlicensed radio frequency spectrum band, a wakeup signal during a monitoring period, the wakeup signal indicating that wireless communications are to be performed between the UE and the base station during an active time period. The UE may identify a guard time period upon receiving the wakeup signal, wherein the guard time period is based at least in part on the UE capability configuration. The UE may perform, after an expiration of the guard time period, the wireless communications with the base station during the active time period.

28 Claims, 17 Drawing Sheets

(58) Field of Classification Search
CPC ......... H04W 52/0203; H04W 52/0209; H04W 4/20; H04W 24/00; H04W 52/0251; H04L 43/00; H04L 29/06183
See application file for complete search history.

(56) References Cited

U.S. PATENT DOCUMENTS

| | | | |
|---|---|---|---|
| 2018/0295595 A1* | 10/2018 | Shellhammer .... | H04W 52/0206 |
| 2018/0332533 A1* | 11/2018 | Bhattad ............ | H04W 52/0216 |
| 2019/0028967 A1* | 1/2019 | Ahn ................... | H04B 7/02 |
| 2019/0150007 A1* | 5/2019 | Frenne ............... | H04W 24/08 |
| | | | 370/252 |
| 2019/0281580 A1* | 9/2019 | Rune .................. | H04W 68/02 |
| 2019/0394710 A1* | 12/2019 | Ugurlu ............... | H04L 27/2607 |
| 2020/0037247 A1* | 1/2020 | Liao .................. | H04W 52/0219 |
| 2020/0077276 A1* | 3/2020 | Zhu ................... | H04W 72/0446 |
| 2020/0145921 A1* | 5/2020 | Zhang ................ | H04W 76/27 |

OTHER PUBLICATIONS

International Search Report and Written Opinion—PCT/US2020/016806—ISA/EPO—dated May 15, 2020.

* cited by examiner

WAKEUP SIGNALING IN AN UNLICENSED RADIO FREQUENCY SPECTRUM BAND

CROSS REFERENCE

The present application for patent claims the benefit of U.S. Provisional Patent Application No. 62/808,224 by NAM et al., entitled "WAKEUP SIGNALING IN AN UNLICENSED RADIO FREQUENCY SPECTRUM BAND," filed Feb. 20, 2019, assigned to the assignee hereof, and expressly incorporated herein.

BACKGROUND

The following relates generally to wireless communications, and more specifically to wakeup signaling in an unlicensed radio frequency spectrum band.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as a user equipment (UE). Some wireless communications systems may support UEs operating in a discontinuous reception (DRX) mode. UEs operating in a DRX mode may transition between a sleep state for power conservation and an active state for data transmission and reception (during an on duration) according to a wakeup signal. Conventional techniques for receiving and/or processing wakeup signals by a UE operating in a DRX mode are deficient, inefficient, or may otherwise be problematic.

SUMMARY

The described techniques relate to improved methods, systems, devices, and apparatuses that support wakeup signaling in an unlicensed radio frequency spectrum band. Generally, the described techniques provide for a guard time period that is specific to a capability of a user equipment (UE). In some aspects, the UE may transmit or otherwise inform a base station of the capability configuration of the UE, which may then be used by the UE and/or base station to identify a guard time period (or guard time for short) used between wakeup signaling and active communications. For example, the UE may transmit or otherwise provide a signal to a base station indicating the UE capability configuration. The base station may then transmit or otherwise provide a wakeup signal to the UE during a monitoring period (e.g., such as a wakeup signal monitoring period) and over an unlicensed radio frequency spectrum band. Generally, the wakeup signal may carry or convey an indication that wireless communications are to be performed between the UE and the base station during an active time period. The base station and/or the UE may utilize the capability configuration of the UE, along with other considerations, to identify the guard time period for the UE. In some aspects, the guard time period may be the time period between the wakeup signal being communicated and the beginning of an active time period in which wireless communications are performed between the base station and the UE. Accordingly, the UE and base station may perform the wireless communications after the guard time period expires and over the unlicensed radio frequency spectrum band.

A method of wireless communications at a UE is described. The method may include transmitting a signal to a base station indicating a UE capability configuration, receiving, over an unlicensed radio frequency spectrum band, a wakeup signal during a monitoring period, the wakeup signal indicating that wireless communications are to be performed between the UE and the base station during an active time period, identifying a guard time period upon receiving the wakeup signal, where the guard time period is based on the UE capability configuration, and performing, after an expiration of the guard time period, the wireless communications with the base station during the active time period.

An apparatus for wireless communications at a UE is described. The apparatus may include a processor, memory in electronic communication with the processor, and instructions stored in the memory. The instructions may be executable by the processor to cause the apparatus to transmit a signal to a base station indicating a UE capability configuration, receive, over an unlicensed radio frequency spectrum band, a wakeup signal during a monitoring period, the wakeup signal indicating that wireless communications are to be performed between the UE and the base station during an active time period, identify a guard time period upon receiving the wakeup signal, where the guard time period is based on the UE capability configuration, and perform, after an expiration of the guard time period, the wireless communications with the base station during the active time period.

Another apparatus for wireless communications at a UE is described. The apparatus may include means for transmitting a signal to a base station indicating a UE capability configuration, receiving, over an unlicensed radio frequency spectrum band, a wakeup signal during a monitoring period, the wakeup signal indicating that wireless communications are to be performed between the UE and the base station during an active time period, identifying a guard time period upon receiving the wakeup signal, where the guard time period is based on the UE capability configuration, and performing, after an expiration of the guard time period, the wireless communications with the base station during the active time period.

A non-transitory computer-readable medium storing code for wireless communications at a UE is described. The code may include instructions executable by a processor to transmit a signal to a base station indicating a UE capability configuration, receive, over an unlicensed radio frequency spectrum band, a wakeup signal during a monitoring period, the wakeup signal indicating that wireless communications are to be performed between the UE and the base station during an active time period, identify a guard time period upon receiving the wakeup signal, where the guard time period is based on the UE capability configuration, and perform, after an expiration of the guard time period, the wireless communications with the base station during the active time period.

Some examples of the method, apparatuses, and non-transitory computer-readable medium described herein may further include operations, features, means, or instructions for determining, based on a receipt time of the wakeup signal, a start time for the active time period.

Some examples of the method, apparatuses, and non-transitory computer-readable medium described herein may further include operations, features, means, or instructions for selecting the guard time period from a set of available guard time periods configured for the UE.

In some examples of the method, apparatuses, and non-transitory computer-readable medium described herein, the guard time period may be autonomously selected from the set of available guard time periods.

In some examples of the method, apparatuses, and non-transitory computer-readable medium described herein, the guard time period may be selected from the set of available guard time periods based on a channel performance metric for the unlicensed radio frequency spectrum band.

In some examples of the method, apparatuses, and non-transitory computer-readable medium described herein, the guard time period may be selected from the set of available guard time periods based on an indication conveyed in at least one of the wakeup signal, a radio resource control (RRC) signal, a medium access control (MAC) control element (CE), or a combination thereof.

Some examples of the method, apparatuses, and non-transitory computer-readable medium described herein may further include operations, features, means, or instructions for transmitting a UE assistance information to the base station, where the guard time period may be based on the UE assistance information.

Some examples of the method, apparatuses, and non-transitory computer-readable medium described herein may further include operations, features, means, or instructions for refraining from communicating with the base station during the guard time period.

In some examples of the method, apparatuses, and non-transitory computer-readable medium described herein, the monitoring period, the guard time period, and the active time period occur during an on duration of a connected mode discontinuous reception operation of the UE.

In some examples of the method, apparatuses, and non-transitory computer-readable medium described herein, the monitoring period and the guard time period occur before on duration of a connected mode discontinuous reception operation of the UE, and the active time period includes the on duration.

A method of wireless communications at a base station is described. The method may include receiving a signal from a UE indicating a UE capability configuration, transmitting, over an unlicensed radio frequency spectrum band, a wakeup signal during a monitoring period, the wakeup signal indicating that wireless communications are to be performed between the UE and the base station during an active time period, identifying a guard time period for the UE associated with the transmission of the wakeup signal, the guard time period is based on the UE capability configuration, and performing, after an expiration of the guard time period, the wireless communications with the UE during the active time period.

An apparatus for wireless communications at a base station is described. The apparatus may include a processor, memory in electronic communication with the processor, and instructions stored in the memory. The instructions may be executable by the processor to cause the apparatus to receive a signal from a UE indicating a UE capability configuration, transmit, over an unlicensed radio frequency spectrum band, a wakeup signal during a monitoring period, the wakeup signal indicating that wireless communications are to be performed between the UE and the base station during an active time period, identify a guard time period for the UE associated with the transmission of the wakeup signal, the guard time period is based on the UE capability configuration, and perform, after an expiration of the guard time period, the wireless communications with the UE during the active time period.

Another apparatus for wireless communications at a base station is described. The apparatus may include means for receiving a signal from a UE indicating a UE capability configuration, transmitting, over an unlicensed radio frequency spectrum band, a wakeup signal during a monitoring period, the wakeup signal indicating that wireless communications are to be performed between the UE and the base station during an active time period, identifying a guard time period for the UE associated with the transmission of the wakeup signal, the guard time period is based on the UE capability configuration, and performing, after an expiration of the guard time period, the wireless communications with the UE during the active time period.

A non-transitory computer-readable medium storing code for wireless communications at a base station is described. The code may include instructions executable by a processor to receive a signal from a UE indicating a UE capability configuration, transmit, over an unlicensed radio frequency spectrum band, a wakeup signal during a monitoring period, the wakeup signal indicating that wireless communications are to be performed between the UE and the base station during an active time period, identify a guard time period for the UE associated with the transmission of the wakeup signal, the guard time period is based on the UE capability configuration, and perform, after an expiration of the guard time period, the wireless communications with the UE during the active time period.

Some examples of the method, apparatuses, and non-transitory computer-readable medium described herein may further include operations, features, means, or instructions for determining, based on a transmission time of the wakeup signal, a start time for the active time period of the UE.

Some examples of the method, apparatuses, and non-transitory computer-readable medium described herein may further include operations, features, means, or instructions for selecting the guard time period from a set of available guard time periods configured for the UE.

In some examples of the method, apparatuses, and non-transitory computer-readable medium described herein, the guard time period may be autonomously selected from the set of available guard time periods.

In some examples of the method, apparatuses, and non-transitory computer-readable medium described herein, the guard time period may be selected from the set of available guard time periods based on a channel performance metric for the unlicensed radio frequency spectrum band.

In some examples of the method, apparatuses, and non-transitory computer-readable medium described herein, the guard time period may be selected from the set of available guard time periods based on an indication conveyed in at least one of the wakeup signal, a RRC signal, a MAC CE, or a combination thereof.

Some examples of the method, apparatuses, and non-transitory computer-readable medium described herein may further include operations, features, means, or instructions for receiving a UE assistance request signal from the UE, where the guard time period may be based on the UE assistance request signal.

Some examples of the method, apparatuses, and non-transitory computer-readable medium described herein may further include operations, features, means, or instructions for refraining from transmitting signal to the UE during the guard time period.

In some examples of the method, apparatuses, and non-transitory computer-readable medium described herein, the monitoring period, the guard time period, and the active time period occur during an on duration of a connected mode discontinuous reception operation of the UE.

In some examples of the method, apparatuses, and non-transitory computer-readable medium described herein, the monitoring period and the guard time period occur before on duration of a connected mode discontinuous reception operation of the UE, and the active time period includes the on duration.

DETAILED DESCRIPTION

Figure 1:
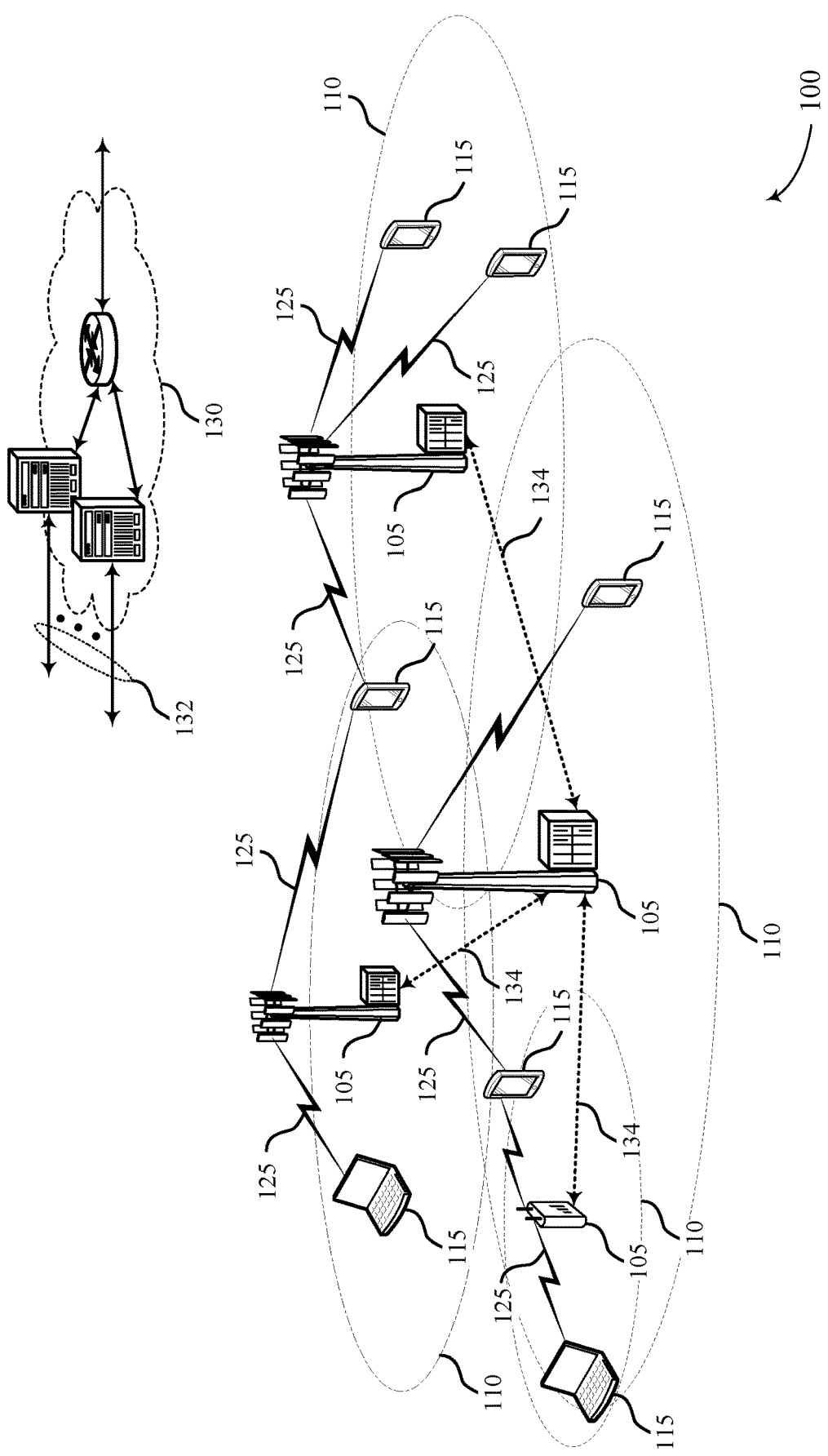
FIG. 1 illustrates an example of a system for wireless communications that supports wakeup signaling for unlicensed bands in accordance with aspects of the present disclosure.

Some wireless communications systems (e.g., New Radio (NR) systems, millimeter wave (mmW) systems, etc.) may support user equipment (UE(s)) operating in a discontinuous reception (DRX) mode (e.g., a connected DRX (C-DRX) mode). A base station (e.g., eNodeB (eNB), a next-generation NodeB or giga-NodeB (either of which may be referred to as a gNB)) may serve a large number of UEs within a cell. In order to efficiently use wakeup signals, the base station may transmit wakeup signals to UEs with which wireless communications are to be performed. Generally, the UE monitors for the wakeup signals during a wakeup signal monitoring period and, when a wakeup signal is detected, perform wireless communications during an active time period over the wireless medium. Conventionally, the starting position between the on duration (e.g., the active time period) and the wakeup signal are fixed on the timeline.

However, such conventional techniques may be problematic when the wireless network is operating over a shared or unlicensed radio frequency spectrum band. Communications in an unlicensed band typically requires a listen-before-talk (LBT) procedure to be performed on the channel in order to capture the medium before a wakeup signal transmission. However, the length of the LBT procedure may vary from one instance to the next. Accordingly, the fixed time distance between the wakeup signal and the active time period may be problematic in an environment where the length of the LBT procedure (and the corresponding wakeup signal transmission) may vary.

Aspects of the described techniques provide for a guard time period to be configured between the wakeup signal and the active time period based on a capability of the UE. This may provide more flexibility when the active time period begins (e.g., a floating on duration), which may improve effectiveness and/or efficiency when operating in an unlicensed radio frequency spectrum band. By way of example, the UE may inform the base station of the capabilities of the UE (e.g., a UE capability report, which may also be referred to as a UE capability configuration). The base station may send a wakeup signal to the UE during a monitoring period (or monitoring window) after a successful LBT procedure has been performed. The base station may use the UE capability configuration to identify a proper guard time period for the UE and configure the UE with the guard time period. Generally, the guard time period (or guard time for short) may be considered the time period between the wakeup signal being communicated and the beginning of the active time period in which wireless communications are performed. According to the identified guard time period, the UE may initiate a wakeup procedure and transition to an active mode for data transmission and reception during the active time period (e.g., upon expiration of the guard time period).

Aspects of the disclosure are initially described in the context of a wireless communications system. Aspects of the disclosure are further illustrated by and described with reference to apparatus diagrams, system diagrams, and flowcharts that relate to wakeup signaling in an unlicensed radio frequency spectrum band.

FIG. 1 illustrates an example of a wireless communications system 100 that supports wakeup signaling in an unlicensed radio frequency spectrum band in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a NR network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNB, a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ LBT procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200 T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

In some aspects, a UE 115 may transmit a signal to a base station 105 indicating a UE capability configuration. The UE 115 may receive, over an unlicensed radio frequency spectrum band, a wakeup signal during a monitoring period, the wakeup signal indicating that wireless communications are to be performed between the UE 115 and the base station 105 during an active time period. The UE 15 may identify a guard time period upon receiving the wakeup signal, wherein the guard time period is based at least in part on the UE capability configuration. The UE 115 may perform, after an expiration of the guard time period, the wireless communications with the base station 105 during the active time period.

In some aspects, a base station 105 may receive a signal from a UE 115 indicating a UE capability configuration. The base station 105 may transmit, over an unlicensed radio frequency spectrum band, a wakeup signal during a monitoring period, the wakeup signal indicating that wireless communications are to be performed between the UE 115 and the base station 105 during an active time period. The base station 105 may identify a guard time period for the UE 115 associated with the transmission of the wakeup signal, the guard time period is based at least in part on the UE capability configuration. The base station 105 may perform, after an expiration of the guard time period, the wireless communications with the UE 115 during the active time period.

Figure 2A:
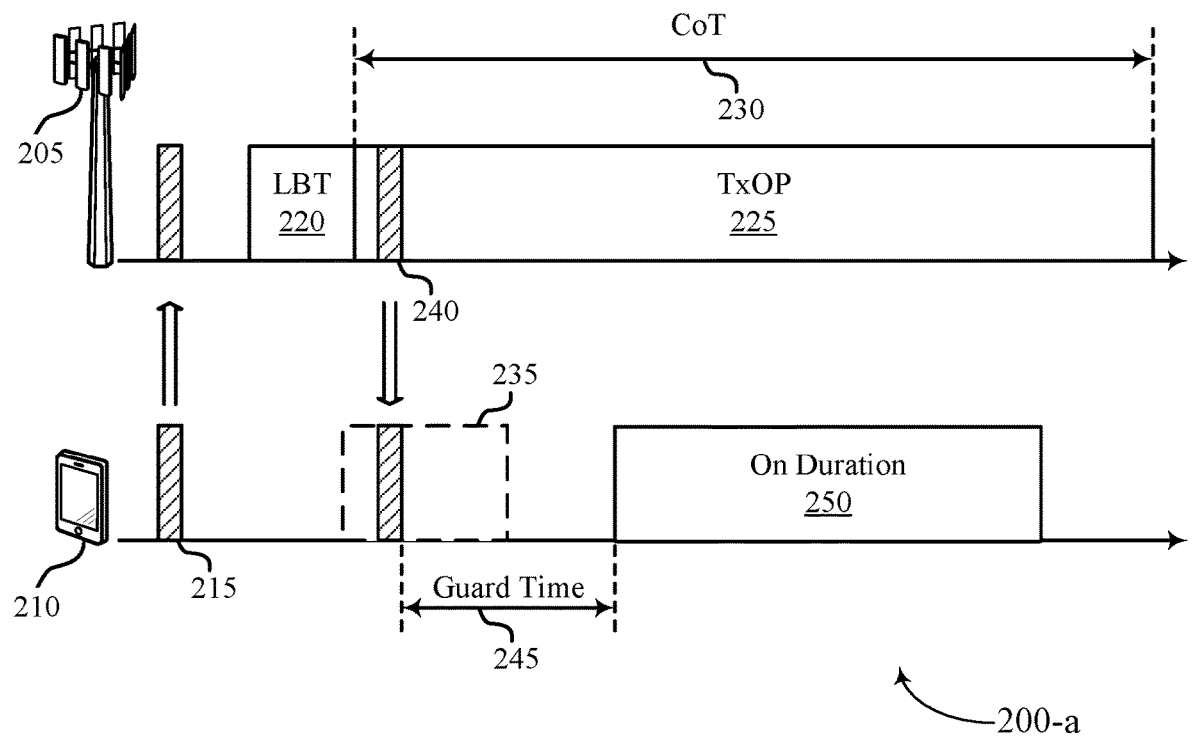
FIGS. 2A and 2B illustrates an example of a wireless communications system that supports wakeup signaling for unlicensed bands in accordance with aspects of the present disclosure.
Figure 2B:
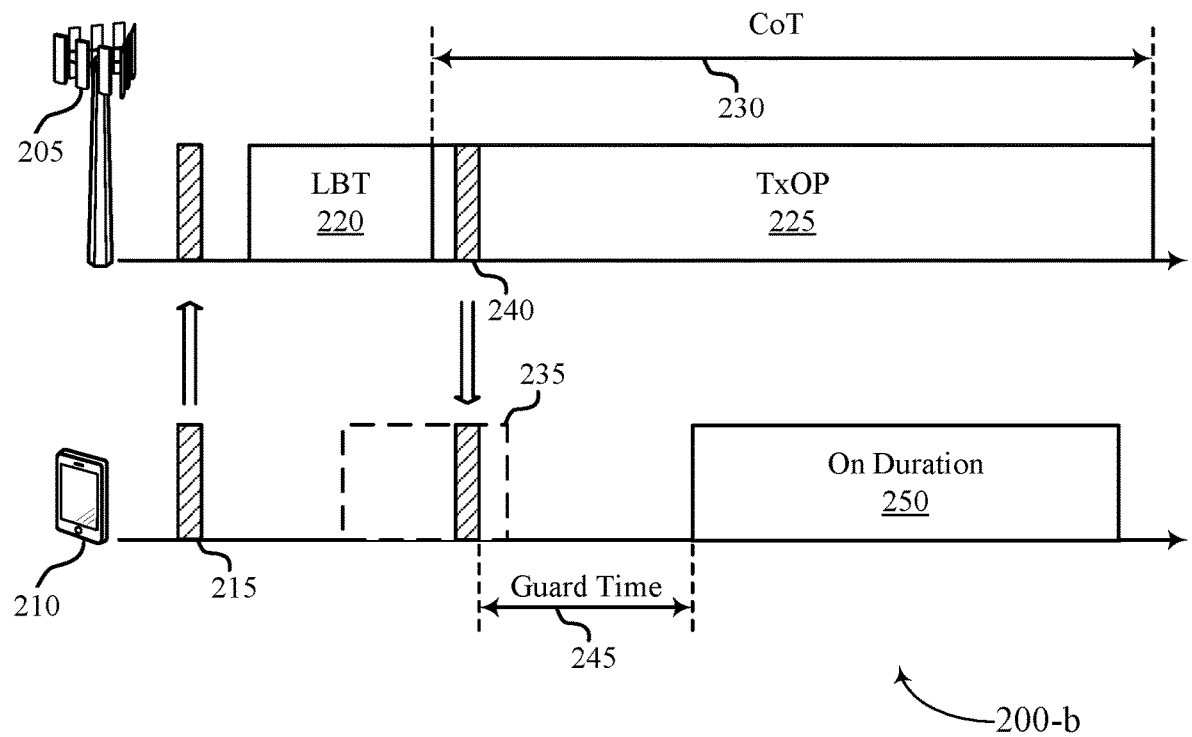

FIGS. 2A and 2B illustrate examples of a wireless communications system 200 that supports wakeup signaling in unlicensed radio frequency spectrum bands in accordance with aspects of the present disclosure. In some examples, wireless communications system 200 may implement aspects of wireless communication system 100. Aspects of wireless communication system 200 may be implemented by a base station 205 and/or a UE 210, which may be examples of the corresponding devices described herein. In some aspects, wireless communication system 200 may operate in a shared or unlicensed radio frequency spectrum band. Broadly, FIG. 2A illustrates an example where an LBT procedure performed by base station 205 is shorter in duration than the LBT procedure illustrated in FIG. 2B.

In a licensed band, conventional techniques may include a monitoring period being configured for a UE operating in a DRX mode (e.g., such as a C-DRX mode) for the UE to listen or monitor for a wakeup signal. For example, the UE may begin monitoring for a wakeup signal from a base station and, if detected, determine that wireless communications are to be performed between the base station and the UE during a subsequent on duration. Accordingly, the UE may transition to an active state during the on duration to perform the wireless communications with the base station in response to receiving the wakeup signal during the wakeup signal monitoring period. If there is no data transmission expected during the on duration, no wakeup signal may be transmitted by the base station, and the UE may remain in a low power state (e.g., a sleep mode) during the on duration.

In an unlicensed radio frequency spectrum band, conventional techniques from the licensed band may be extended such that the monitoring period for the wakeup signal may be configured for the UE. However, operations in a shared or unlicensed radio frequency spectrum band typically require an LBT procedure to be performed on a channel in the unlicensed band before wireless communications can be performed. However, the duration of the LBT procedure may vary from one instance to the next, e.g., due to different types of LBT procedures being performed, LBT procedures taking longer in some instances, a large number of communication nodes (e.g., UE(s) and/or base station(s)) contending for the channel, and the like. As the base station must successfully perform the LBT procedure before a wakeup signal can be transmitted on the channel in the unlicensed band, the timing for communicating the wakeup signal may therefore vary from one instance to the next. Accordingly, the UE may need to monitor for the wakeup signal within a relatively long monitoring period to account for the LBT delay. After detecting the wakeup signal, the UE may also require a warm-up time in order to be ready for active mode operations during the on duration, e.g., to perform wireless communications with the base station.

As one non-limiting example, a wakeup signal monitoring period may be located before an on duration (e.g., the active time period in which active wireless communications are performed). The starting position of the on duration and the wakeup signal monitoring period are fixed in the timeline, e.g., in terms of subframe number (SFN), slot index, etc., according to conventional techniques. The time gap between the end of the wakeup signal monitoring period and the start of the on duration should be long enough to guarantee warm-up time for the UE, regardless of the wakeup signal position within the wakeup signal monitoring period. Moreover, some UEs have different capabilities, such that the warm-up time may be longer for some UEs than for other UEs. This may create a situation where the UE receives the wakeup signal near the end of the wakeup signal monitoring period, which may not provide enough time for the UE to properly warm-up before the on duration (e.g., due to the starting position of the on duration and the wakeup signal monitoring period being fixed). In another example, a UE that receives the wakeup signal during the beginning of the wakeup signal monitoring period and is capable of a relatively short warm-up time may experience wasted resources as it waits for the on duration to begin (again due to the fixed time gap between the wakeup signal and the on duration). That is, due to the time resources being limited in an unlicensed band (e.g., the channel is typically captured for a channel occupancy time (CoT)), having a long time gap between the wakeup signal communication and the start of the on duration can be wasteful.

Accordingly, aspects of the described techniques may provide for a flexible wakeup time configuration for a UE operating in a shared or unlicensed radio frequency spectrum band. In some aspects, this may include configuring UE 210 with a guard time period (or guard time for short) between communicating a wakeup signal (transmitting by base station 205 and/or receiving by UE 210) and the beginning an active state where wireless communications are performed between UE 210 and base station 205 (e.g., uplink and/or downlink wireless communications).

For example, UE 210 may transmit (and base station 205 may receive) a signal 215 carrying or otherwise conveying a UE capability configuration. In some aspects, the UE capability configuration may include, but is not limited to, various operational and/or performance capabilities that UE 210 supports. The UE capability configuration may include an indication of one or more guard time(s) supported by UE 210. The UE capability configuration may include an indication of a minimum warm-up time required by UE 210. The UE capability configuration may include an indication of a set of guard times supported by UE 210. In some aspects, the UE capability configuration indicated in signal 215 may be explicit and/or implicit (e.g., the signal 215 may carry an index or pointer that can be utilized by base station 205 in conjunction with a lookup table). In some aspects, the signal 215 may be a RRC signal, a MAC CE, a control channel signal, and the like, communicated to base station 205.

In some aspects, base station 205 may receive the signal indicating the UE capability configuration and determine or otherwise identify one or more guard times supported by UE 210. For example, base station 205 may recover the guard time(s) supported by UE 210 being explicitly indicated in the signal 215. Additionally or alternatively, base station 205 may determine or otherwise identify the guard time(s) supported by UE 210 being implicitly indicated in the signal 215. For example, base station 205 may recover a minimum warm-up time of UE 210 from the signal 215, and use this information to calculate or otherwise determine the guard time(s) supported by UE 210.

Although signal 215 is illustrated as occurring first in the timeline of wireless communication system 200, it is to be understood that UE 210 may provide signal 215 to base station 205 during a channel occupancy time (e.g., during an initial connection establishment and/or as part of a request-to-send/clear-to-send (RTS/CTS) exchange with base station 205).

Moreover, it is to be understood the base station 205 may receive signals from other UEs within its coverage area, with each signal indicating a UE capability configuration for the corresponding UE. As UEs may be configured differently (e.g., may have different capabilities), base station 205 may determine, for one or more of the UEs within its coverage area, the guard time(s) supported by each UE.

Base station 205 may determine that it has wireless communications to perform with UE 210 and, in response, perform an LBT procedure 220 on one or more channels of an unlicensed radio frequency spectrum band (or unlicensed band for short). The LBT procedure 220 may be a one-shot LBT procedure, a full LBT procedure, and the like. In some aspects, base station 205 may transmit a signal (not shown) to UE 210 carrying or otherwise conveying an indication that the LBT procedure 220 was successful and/or that base station 205 has secured the channel in the unlicensed band for a transmission opportunity (TxOP) 225 having a corresponding CoT 230. In some aspects, the signal (not shown) may include a RTS/CTS exchange, a channel reservation signal, and the like.

In some aspects, the LBT procedure 220 may take longer in some instances than in others. For example, the LBT procedure 220 illustrated in FIG. 2A of wireless communication system 200-a is generally shorter in time duration than the LBT procedure 220 illustrated in FIG. 2B of wireless communication system 200-b. Such differences in duration may be based on the type of LBT procedure being performed, based on the amount of traffic detected during the LBT procedure 220, based on different threshold levels being utilized in different LBT procedures, and the like.

In some aspects, UE 210 may be configured with a monitoring period 235 in which UE 210 is to monitor for wakeup signal 240 from base station 205. As the success and/or duration of LBT procedure 220 may vary, the duration of the monitoring period 235 may be selected to ensure that UE 210 is monitoring for the wakeup signal 240 at the appropriate time. Once the LBT procedure 220 is successful and based on wireless communications to be performed between base station 205 and UE 210, base station 205 may transmit (and UE 210 may receive) the wakeup signal 240 during the monitoring period 235 over the shared or unlicensed radio frequency spectrum band. In some aspects, the wakeup signal may carry or convey an indication that wireless communications are to be performed between UE 210 and base station 205 during an active time period. In one non-limiting example, the wakeup signal may be a DCI signal, a RRC signal, a MAC CE, and the like.

Figure 3:
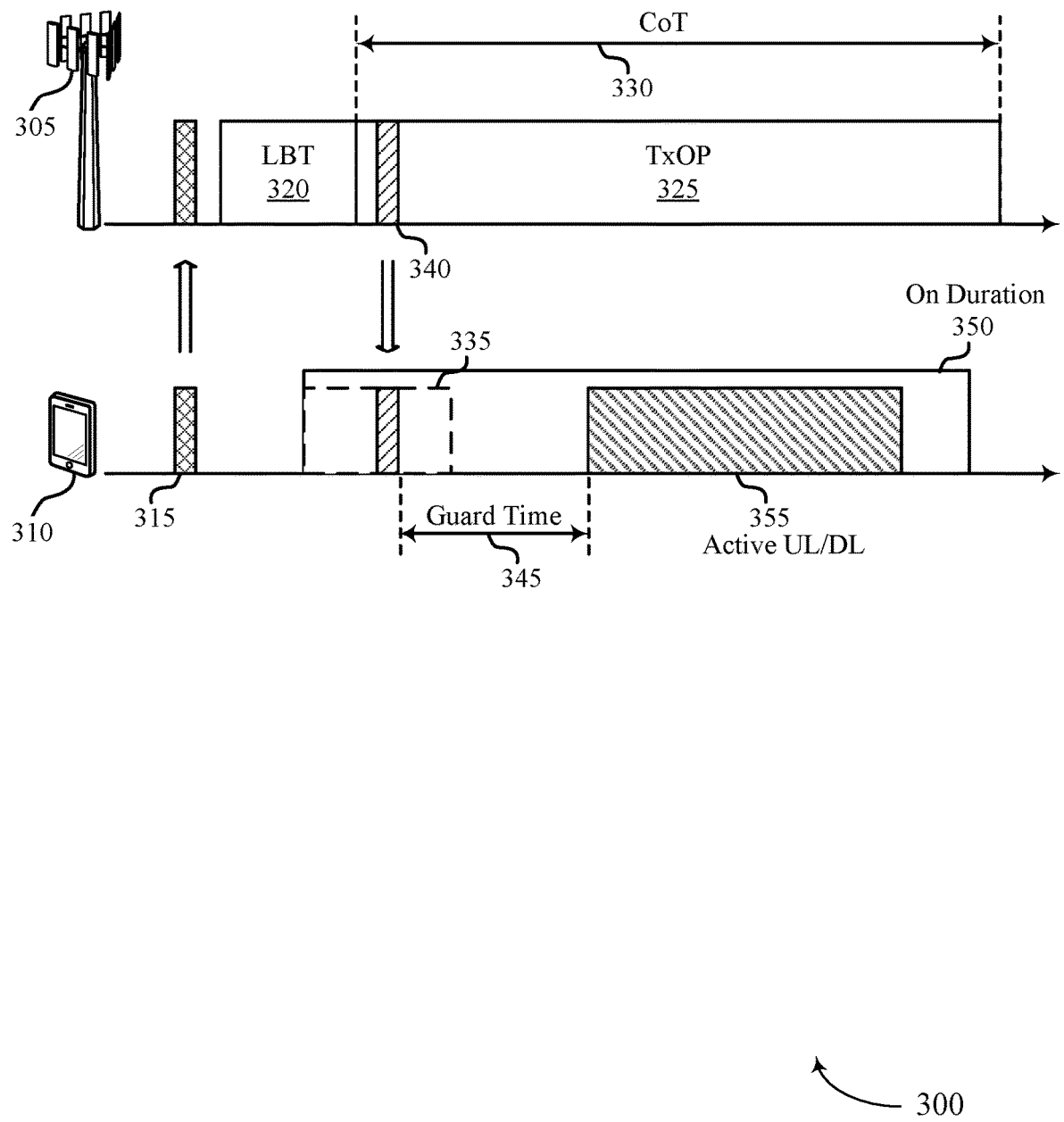
FIG. 3 illustrates an example of a wireless communications system that supports wakeup signaling for unlicensed bands in accordance with aspects of the present disclosure.

In the example wireless communication system 200, the active time period is illustrated as corresponding to an on duration 250 in which active wireless communications are performed between base station 205 and UE 210. However, it is to be understood that in some instances (such as is shown in FIG. 3) some or all of the monitoring period 235, guard time 245, and/or active time period may occur within an on duration of UE 210.

After the wakeup signal is communicated (e.g., received by UE 210 and/or transmitted by base station 205), the guard time 245 may be identified by base station 205 and/or UE 210. As discussed, base station 205 and/or UE 210 may identify or otherwise determine the guard time 245 based on the UE capability configuration.

That is, in some examples UE 210 may provide the UE capability configuration to base station 205 in signal 215, but then autonomously determine or otherwise identify the guard time 245 based on the information indicated in the UE capability configuration provided to base station 205. In other examples, UE 210 may determine or otherwise identify the guard time 245 based on information received from base station 205. For example, the wakeup signal 240 may carry or otherwise convey an indication of the guard time 245. In other examples, UE 210 and base station 205 may exchange the UE capability configuration prior to LBT procedure 220 being performed. In this example, UE 210 and base station 205 may identify or otherwise determine the guard time 245 beforehand (e.g., during an initial connection establishment, using RRC signaling, using MAC CE signaling, and the like).

In some aspects, UE 210 may be configured with more than one guard time periods. For example, a set of available guard time periods may be configured for UE 210. In some aspects, one or more of the guard time periods within the set of available guard time periods may be selected based on the UE capability configuration indicated by UE 210, based on the warmup time of UE 210, based on channel performance conditions, based on communication needs, and the like. Accordingly, the guard time 245 identified or otherwise determined by base station 205 and/or UE 210 may be included in the set of available guard time periods configured for UE 210.

In some aspects, UE 210 may autonomously select the guard time 245 from the set of available guard time periods. In some aspects, the guard time 245 selected from the set of available guard time periods may be signaled to UE 210 by base station 205 (e.g., signaled in the wakeup signal 240, an RRC signal, a MAC CE signal, a DCI, and the like). In some aspects, the guard time 245 may be selected from the set of available guard time periods based on a channel performance considerations, channel congestion considerations, the amount of data being communicated, other scheduling considerations, and the like.

In some aspects, a UE assistance information request may be used as part of identifying or otherwise determining the guard time 245. For example, UE 210 may transmit (and base station 205 may receive) a UE assistance information (e.g., a request from UE 210) that carries or otherwise conveys an indication of a requested guard time period. Base station 205 and/or UE 210 may identify or otherwise select the guard time 245 based at least in part on the UE assistance information.

In some aspects, base station 205 may refrain from performing wireless communications with UE 210 during the guard time 245. For example, base station 205 may not transmit downlink control and/or data signals, reference signals, and the like, to UE 210 during the guard time 245.

Base station 205 can perform wireless communications with other UEs within its coverage area during the guard time 245.

After the expiration of the guard time 245 (e.g., the guard time period), base station 205 and UE 210 may perform the wireless communications during the active time period (which is shown as the on duration 250 in this example). The wireless communications may include uplink communications and/or downlink communications.

Accordingly, aspects of the described techniques may support guard time 245 being configured or otherwise selected that is unique to UE 210 (e.g., UE-specific). In some aspects, the guard time 245 may be based on the UE capability configuration (e.g., the UE capability report). Accordingly, the guard time 245 may be shorter in duration for advanced UEs or longer in duration for legacy UEs. In some aspects, the guard time 245 duration may be based on the type of UE, e.g., an IoT-configured device may use a longer guard time 245 than a NR-configured device.

As discussed above, guard time 245 being unique to each UE may improve wakeup signal operations between base station 205 and UE 210 (and other UEs within the coverage area of base station 205). For example and as is illustrated in FIGS. 2A and 2B, the LBT procedure 220 of FIG. 2B is longer in duration than the LBT procedure 220 of FIG. 2A. The result is that the wakeup signal 240 is received earlier in the monitoring period 235 of FIG. 2A than in the monitoring period 235 of FIG. 2B. However, utilizing the guard time 245 that is UE specific may minimize wasted resources while ensuring that there is ample time for the wireless communications during the active state. Consequentially, in some aspects the on duration 250 (e.g., the active state) may float within the TxOP 225. This may also improve scheduling options for base station 205. That is, guard time 245 may start after detecting the wakeup signal 240. During guard time 245, UE 210 may warm-up various hardware subsystems in preparation for wireless communications with base station 205. Depending upon the position of the wakeup signal 240 (e.g., when within the monitoring period 235 the wakeup signal 240 is detected), the start of the active time (e.g., on duration 250) for UE 210 may vary, effectively creating a floating start position for the on duration 250.

FIG. 3 illustrates an example of a wireless communications system 300 that supports wakeup signaling for unlicensed bands in accordance with aspects of the present disclosure. In some examples, wireless communications system 300 may implement aspects of wireless communication systems 100 and/or 200. Aspects of wireless communication system 300 may be implemented by base station 305 and/or UE 310, which may be examples of the corresponding devices described herein. In some aspects, wireless communication system 300 may operate in a shared or unlicensed radio frequency spectrum band.

Generally, wireless communication system 300 is provided to illustrate the example where some or all of the wakeup signal monitoring period, guard time, and/or active state occurs within an on duration configured for UE 310. The on duration may correspond to UE 310 operating in a DRX mode, such as a C-DRX mode. It is to be understood that the features illustrated in wireless communication system 300 are provided by way of example only, and other configurations may also be supported according to the described techniques. For example, some or all of the wakeup signal monitoring period may occur prior to the on duration 350. Similarly, some or all of the guard time may occur prior to the on duration 350.

Accordingly, UE 310 may be configured with an on duration 350 as part of DRX operations. UE 310 may transmit or otherwise provide a signal 315 to base station 305 carrying or conveying an indication of the UE capability configuration. Base station 305 may determine that it has wireless communications to perform with UE 310. Accordingly, base station 305 may perform an LBT procedure 320 to grab or otherwise capture the channel in the unlicensed band to use for the wireless communications. When the LBT procedure 320 is successful, base station 305 may capture the channel for TxOP 325 having a corresponding CoT 330.

Base station 305 may transmit or otherwise provide a wakeup signal 340 to UE 310 during the monitoring period 335. UE 310 and/or base station 305 may identify the guard time 345 for UE 310, e.g., based on the UE capability configuration. UE 310 may autonomously identify the guard time 345 and/or may identify the guard time 345 based on information carried or conveyed in the wakeup signal 340, or other signals. As discussed, in some examples the guard time 345 may be selected from a set of available guard time periods. After the expiration of the guard time 345, base station 305 and UE 310 may perform wireless communications during an active time period 355. The wireless communications may include uplink communications and/or downlink communications. As discussed above, some or all of the features described with reference to wireless communication system 300 may occur during the on duration 350.

Figure 4:
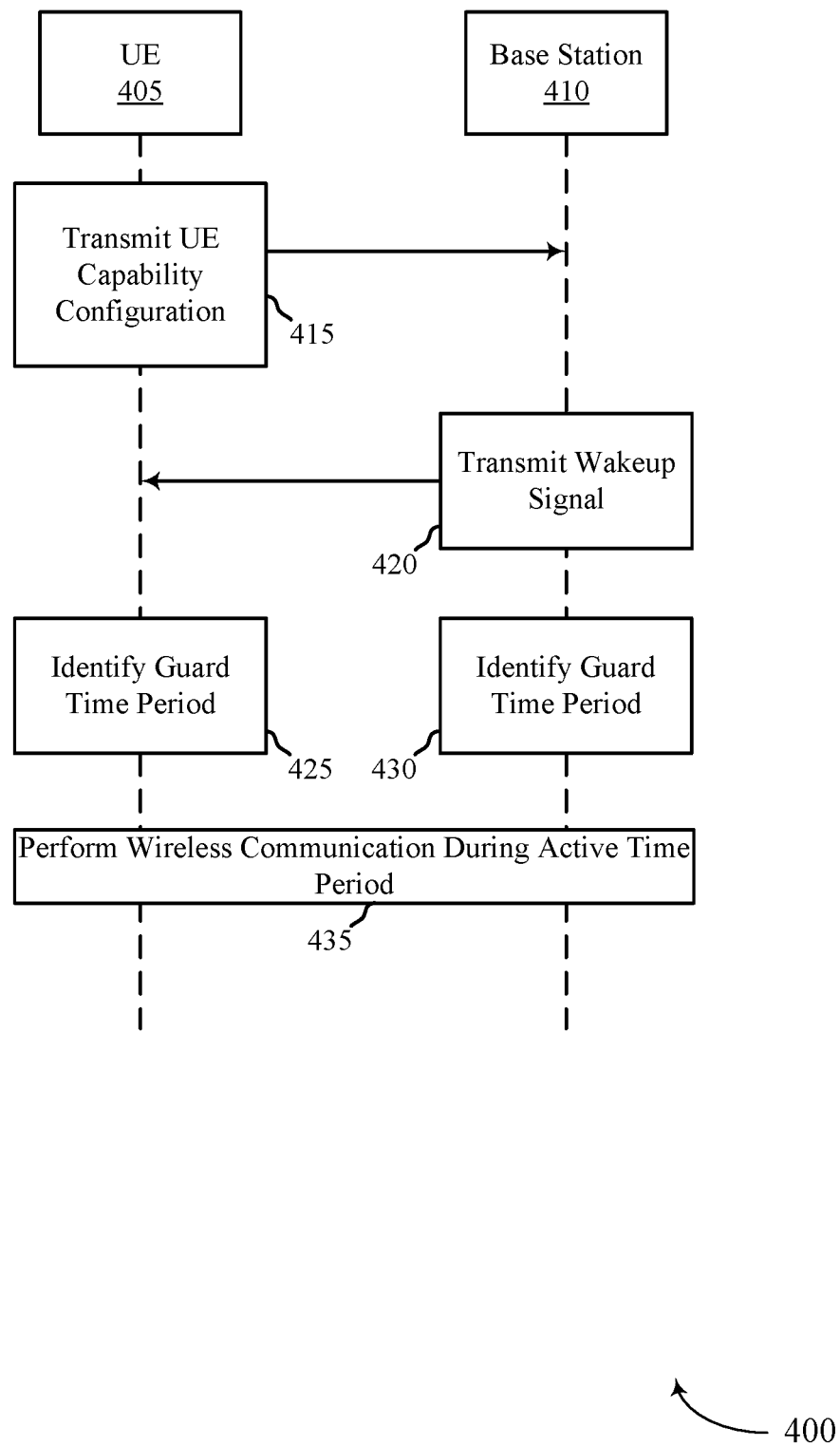
FIG. 4 illustrates an example of a process that supports wakeup signaling for unlicensed bands in accordance with aspects of the present disclosure.

FIG. 4 illustrates an example of a process 400 that supports wakeup signaling for unlicensed bands in accordance with aspects of the present disclosure. In some examples, process 400 may implement aspects of wireless communication systems 100, 200, and/or 300. Aspects of process 400 may be implemented by UE 405 and/or base station 410, which may be examples of the corresponding devices described herein. In some aspects, the features described with reference to process 400 may be implemented in a wireless communication system operating in a shared or unlicensed radio frequency spectrum band.

At 415, UE 405 may transmit (and base station 410 may receive) a signal indicating a UE capability configuration. In some aspects, the UE capability configuration may carry or convey an indication of one or more performance capabilities supported by UE 405. In some aspects, the UE capability configuration may indicate a warm-up time for UE 405, e.g., a time period that UE 405 needs to warm-up one or more systems supporting wireless communications. In some aspects, the signal indicating the UE capability configuration may be communicated prior to an LBT procedure performed by base station 410 to grab or capture the channel in the unlicensed band. In other aspects, the signal indicating the UE capability configuration may be transmitted after base station 410 has grabbed or captured the channel in the unlicensed band, e.g., as part of an exchange between UE 405 and base station 410 after the LBT procedure.

At 420, base station 410 may transmit (and UE 405 may receive), over an unlicensed radio frequency spectrum band, a wakeup signal during a monitoring period. In some aspects, the wakeup signal may carry or convey an indication that wireless communications are to be performed between UE 405 and base station 410 during an active time period. In some aspects, the wakeup signal may be transmitted after base station 410 performs a successful LBT procedure to capture the channel in the unlicensed band for a TxOP.

At 425, UE 405 may identify a guard time period (or guard time for short) upon receiving the wakeup signal. In some aspects, the guard time period may be based at least in part on the UE capability configuration. In some aspects, this may include UE 405 determining the start time for the active time period based at least in part on the receipt time of the wakeup signal.

In some aspects, this may include selecting the guard time period from the set of available guard time periods configured for UE 405. For example, the guard time period may be autonomously selected by UE 405 from the set of available guard time periods. In some aspects, the guard time period may be selected from the set of available guard time periods based on the channel performance metric for the unlicensed radio frequency spectrum band. In some aspects, the guard time period may be selected from the set of available guard time periods based on an indication conveyed in the wakeup signal, an RRC signal, a MAC CE, and the like.

In some aspects, this may include UE 405 transmitting (and base station 410 receiving) a UE assistance information (not shown), with the guard time period being selected based on the UE assistance information. In some aspects, UE 405 may refrain from communicating with base station 410 during the guard time period, and vice versa.

In some aspects, the monitoring period, the guard time period, and the active time period may occur during an on duration of a C-DRX operation of UE 410. In some aspects, some or all of the monitoring period and the guard time period may occur before or prior to an on duration of a C-DRX operation of UE 405, with the active time period occurring or otherwise being the same as the on duration.

At 430, base station 410 may identify a guard time period for UE 405 associated with the transmission of the wakeup signal. Again, the guard time period may be based at least in part on the UE capability configuration. In some aspects, this may include base station 410 determining a start time for the active time period of UE 405 based on the transmission time of the wakeup signal.

In some aspects, this may include base station 410 selecting the guard time period from a set of available guard time periods configured for UE 405. In some aspects, base station 410 may autonomously select the guard time period from the set of available guard time periods. In some aspects, base station 410 may select the guard time period from the set of available guard time periods based on the channel performance over the unlicensed radio frequency spectrum band. In some aspects, the guard time period may be selected from the set of available guard time periods based on an indication conveyed in the wakeup signal, an RRC signal, a MAC CE, and the like.

In some aspects, this may include base station 410 receiving a UE assistance information request signal from UE 405. The guard time period may be selected based at least in part on the UE assistance request signal (e.g., a UE assistance information). In some aspects, this may include base station 410 refraining from transmitting one or more signals to UE 405 during the guard time period, or vice versa.

In some aspects, the monitoring period (e.g., the wakeup signal monitoring period), the guard time period, and the active time period may occur during an on duration of a C-DRX operation of UE 405. In some aspects, some or all of the monitoring period and/or the guard time period may occur prior to (or before) the on duration of the C-DRX operation of UE 405, with the active time period occurring during the on duration.

At 435, UE 405 and base station 410 may perform, after an expiration of the guard time period, the wireless communications during the active time period. In some aspects, this may include performing uplink and/or downlink wireless communications.

Figure 5:
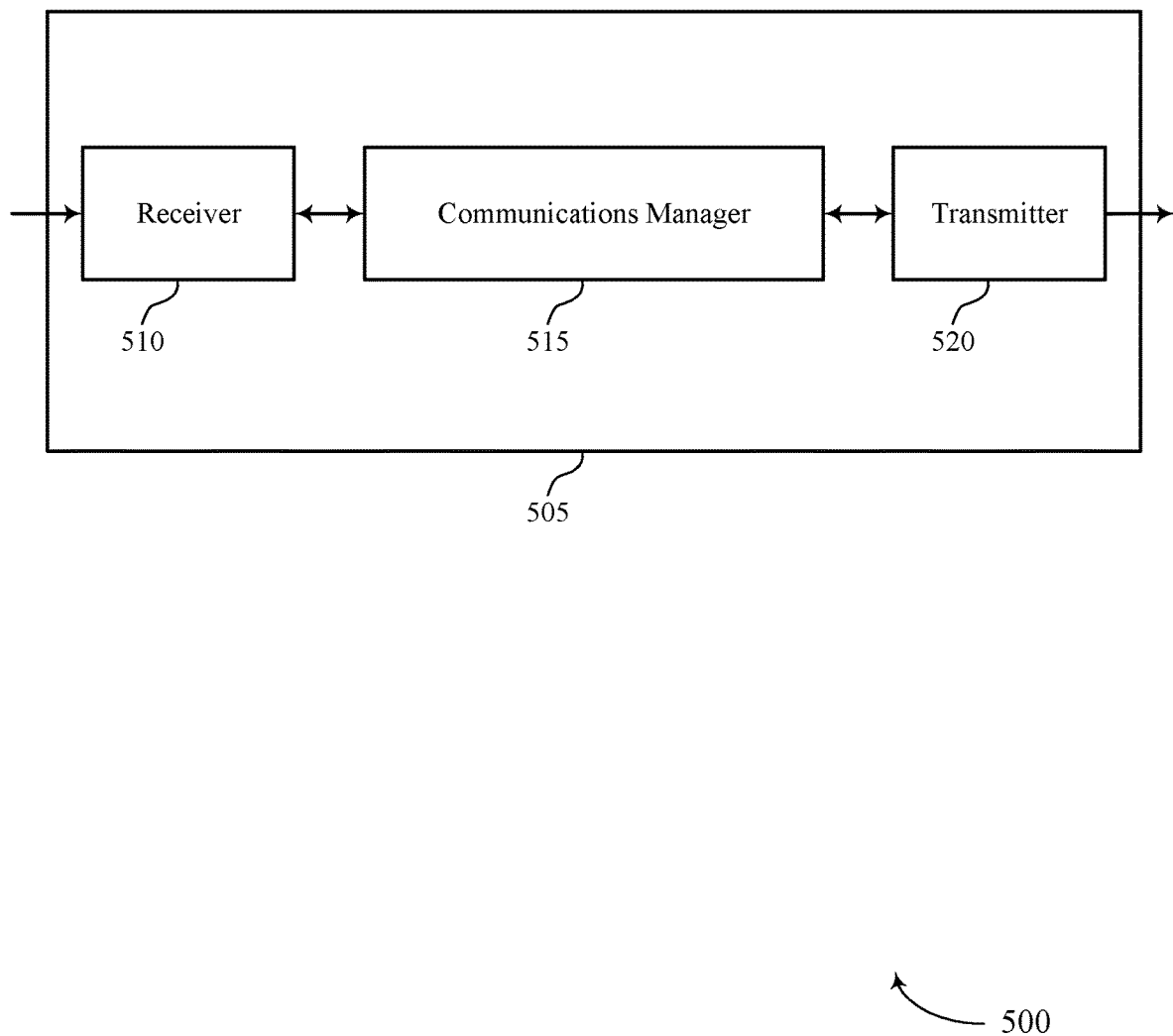
FIGS. 5 and 6 show block diagrams of devices that support wakeup signaling for unlicensed bands in accordance with aspects of the present disclosure.

FIG. 5 shows a block diagram 500 of a device 505 that supports wakeup signaling for unlicensed bands in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to wakeup signaling for unlicensed bands, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit a signal to a base station indicating a UE capability configuration, receive, over an unlicensed radio frequency spectrum band, a wakeup signal during a monitoring period, the wakeup signal indicating that wireless communications are to be performed between the UE and the base station during an active time period, identify a guard time period upon receiving the wakeup signal, where the guard time period is based on the UE capability configuration, and perform, after an expiration of the guard time period, the wireless communications with the base station during the active time period. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
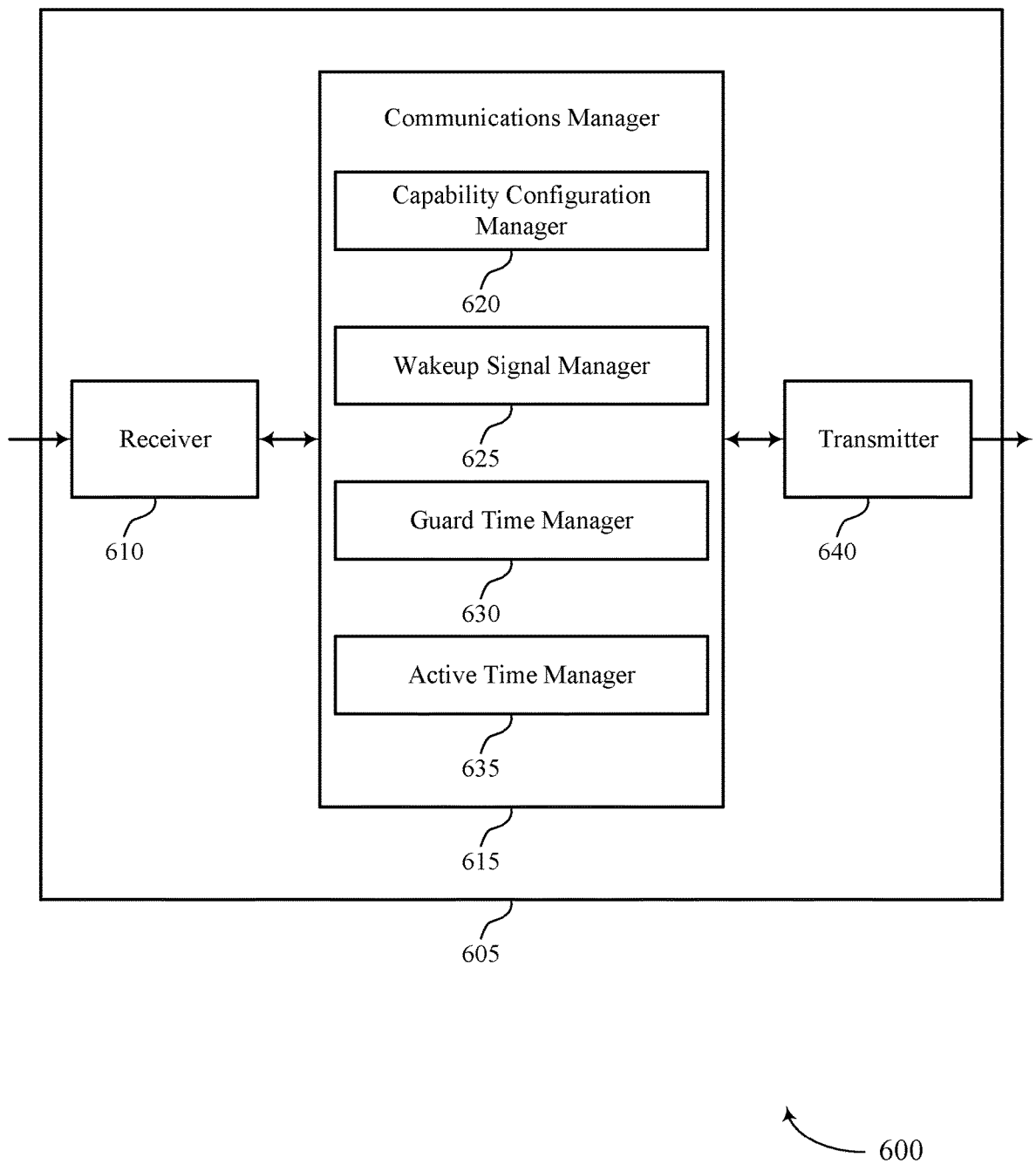

FIG. 6 shows a block diagram 600 of a device 605 that supports wakeup signaling for unlicensed bands in accordance with aspects of the present disclosure. The device 605 may be an example of aspects of a device 505, or a UE 115 as described herein. The device 605 may include a receiver 610, a communications manager 615, and a transmitter 640. The device 605 may also include a processor. Each of these components may be in communication with one another (e.g., via one or more buses).

The receiver 610 may receive information such as packets, user data, or control information associated with various information channels (e.g., control channels, data channels, and information related to wakeup signaling for unlicensed bands, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a capability configuration manager 620, a wakeup signal manager 625, a guard time manager 630, and an active time manager 635. The communications manager 615 may be an example of aspects of the communications manager 810 described herein.

The capability configuration manager 620 may transmit a signal to a base station indicating a UE capability configuration.

The wakeup signal manager 625 may receive, over an unlicensed radio frequency spectrum band, a wakeup signal during a monitoring period, the wakeup signal indicating that wireless communications are to be performed between the UE and the base station during an active time period.

The guard time manager 630 may identify a guard time period upon receiving the wakeup signal, where the guard time period is based on the UE capability configuration.

The active time manager 635 may perform, after an expiration of the guard time period, the wireless communications with the base station during the active time period.

The transmitter 640 may transmit signals generated by other components of the device 605. In some examples, the transmitter 640 may be collocated with a receiver 610 in a transceiver module. For example, the transmitter 640 may be an example of aspects of the transceiver 820 described with reference to FIG. 8. The transmitter 640 may utilize a single antenna or a set of antennas.

Figure 7:
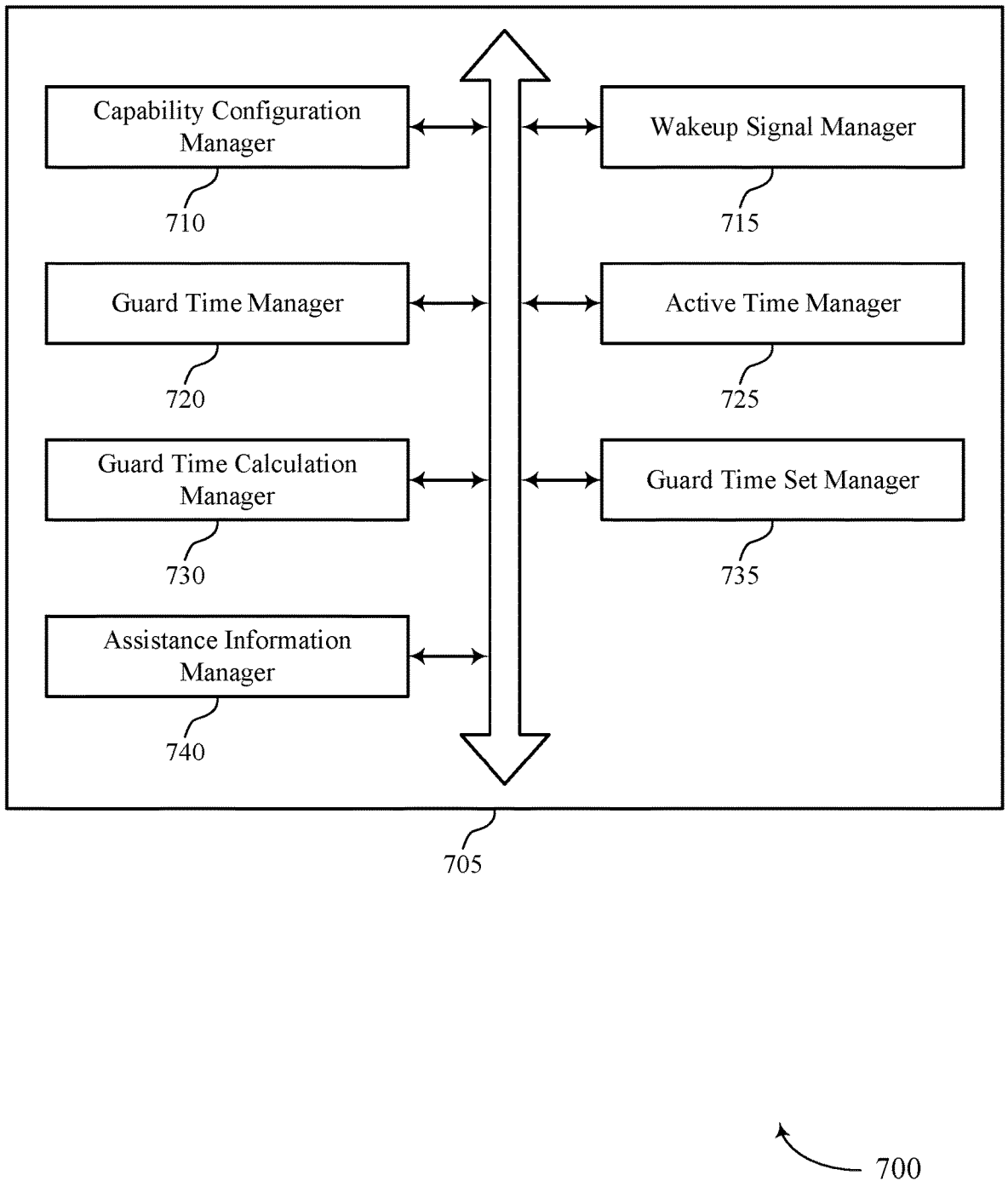
FIG. 7 shows a block diagram of a communications manager that supports wakeup signaling for unlicensed bands in accordance with aspects of the present disclosure.

FIG. 7 shows a block diagram 700 of a communications manager 705 that supports wakeup signaling for unlicensed bands in accordance with aspects of the present disclosure. The communications manager 705 may be an example of aspects of a communications manager 515, a communications manager 615, or a communications manager 810 described herein. The communications manager 705 may include a capability configuration manager 710, a wakeup signal manager 715, a guard time manager 720, an active time manager 725, a guard time calculation manager 730, a guard time set manager 735, and an assistance information manager 740. Each of these modules may communicate, directly or indirectly, with one another (e.g., via one or more buses).

The capability configuration manager 710 may transmit a signal to a base station indicating a UE capability configuration.

The wakeup signal manager 715 may receive, over an unlicensed radio frequency spectrum band, a wakeup signal during a monitoring period, the wakeup signal indicating that wireless communications are to be performed between the UE and the base station during an active time period.

The guard time manager 720 may identify a guard time period upon receiving the wakeup signal, where the guard time period is based on the UE capability configuration.

The active time manager 725 may perform, after an expiration of the guard time period, the wireless communications with the base station during the active time period. In some examples, the active time manager 725 may refrain from communicating with the base station during the guard time period. In some cases, the monitoring period, the guard time period, and the active time period occur during an on duration of a connected mode discontinuous reception operation of the UE. In some cases, the monitoring period and the guard time period occur before on duration of a connected mode discontinuous reception operation of the UE. In some cases, the active time period includes the on duration.

The guard time calculation manager 730 may determine, based on a receipt time of the wakeup signal, a start time for the active time period.

The guard time set manager 735 may select the guard time period from a set of available guard time periods configured for the UE. In some cases, the guard time period is autonomously selected from the set of available guard time periods. In some cases, the guard time period is selected from the set of available guard time periods based on a channel performance metric for the unlicensed radio frequency spectrum band. In some cases, the guard time period is selected from the set of available guard time periods based on an indication conveyed in at least one of the wakeup signal, a RRC signal, a MAC CE, or a combination thereof.

The assistance information manager 740 may transmit a UE assistance information to the base station, where the guard time period is based on the UE assistance information.

Figure 8:
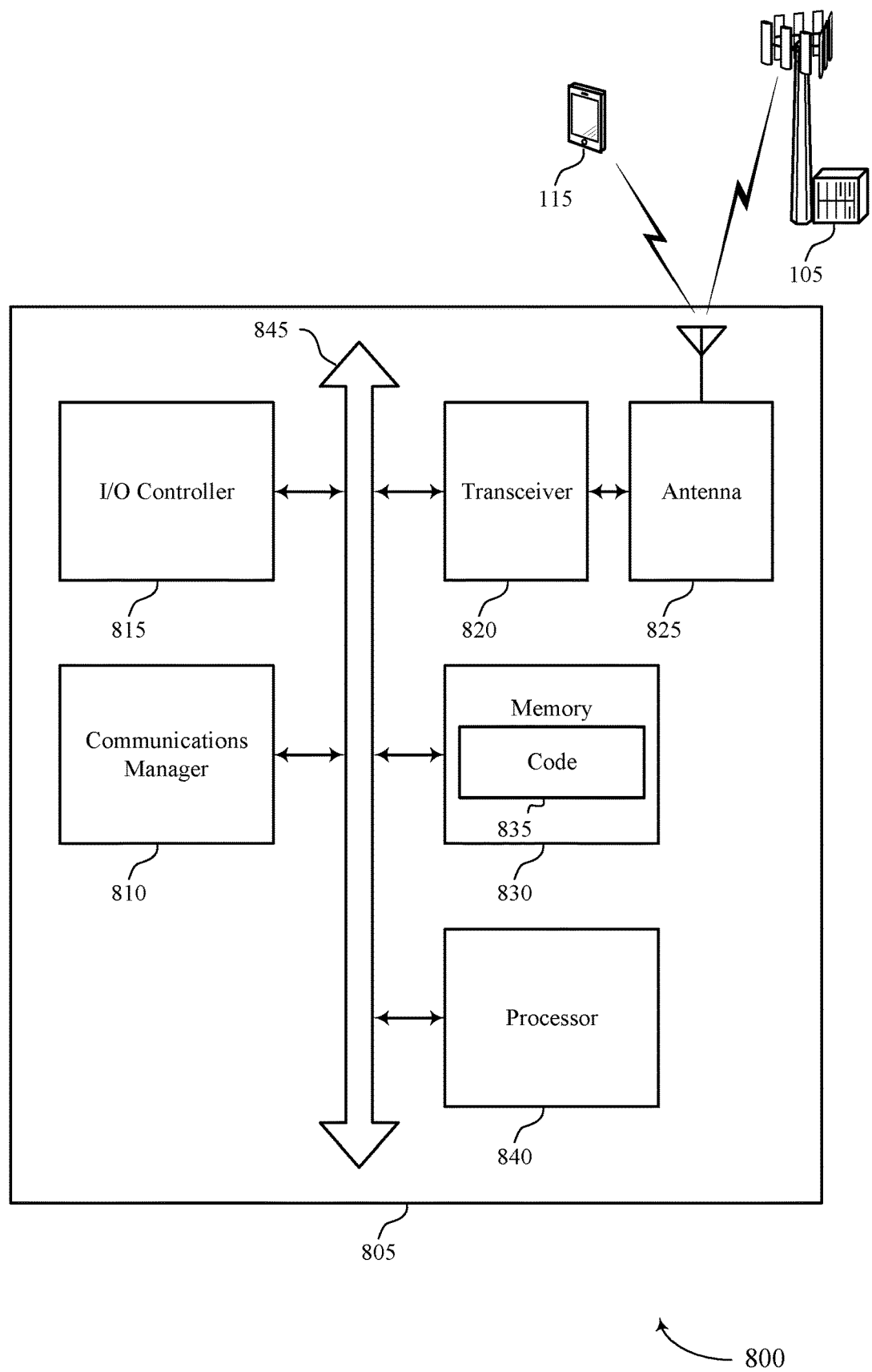
FIG. 8 shows a diagram of a system including a device that supports wakeup signaling for unlicensed bands in accordance with aspects of the present disclosure.

FIG. 8 shows a diagram of a system 800 including a device 805 that supports wakeup signaling for unlicensed bands in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit a signal to a base station indicating a UE capability configuration, receive, over an unlicensed radio frequency spectrum band, a wakeup signal during a monitoring period, the wakeup signal indicating that wireless communications are to be performed between the UE and the base station during an active time period, identify a guard time period upon receiving the wakeup signal, where the guard time period is based on the UE capability configuration, and perform, after an expiration of the guard time period, the wireless communications with the base station during the active time period.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting wakeup signaling for unlicensed bands).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
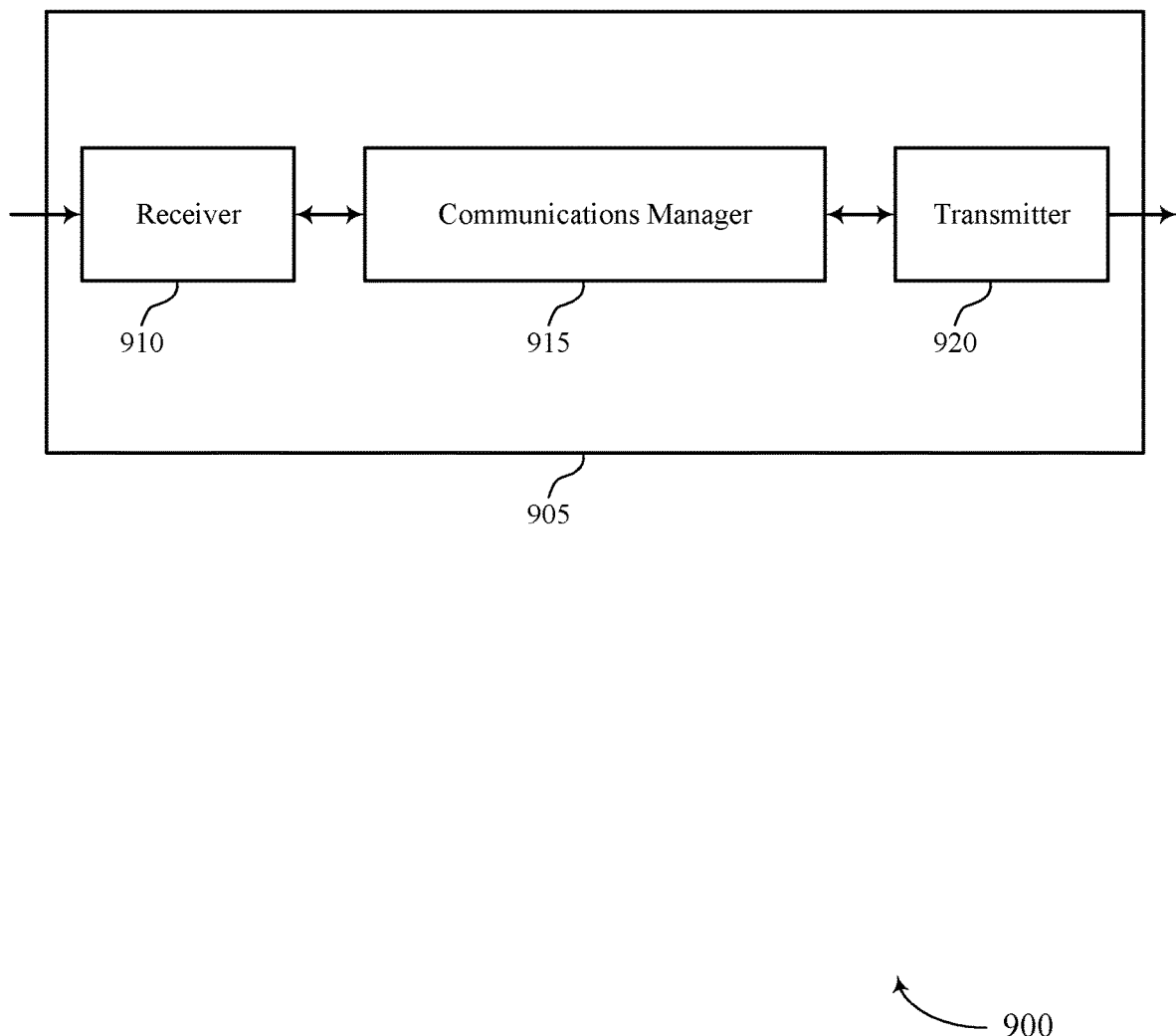
FIGS. 9 and 10 show block diagrams of devices that support wakeup signaling for unlicensed bands in accordance with aspects of the present disclosure.

FIG. 9 shows a block diagram 900 of a device 905 that supports wakeup signaling for unlicensed bands in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to wakeup signaling for unlicensed bands, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive a signal from a UE indicating a UE capability configuration, transmit, over an unlicensed radio frequency spectrum band, a wakeup signal during a monitoring period, the wakeup signal indicating that wireless communications are to be performed between the UE and the base station during an active time period, identify a guard time period for the UE associated with the transmission of the wakeup signal, the guard time period is based on the UE capability configuration, and perform, after an expiration of the guard time period, the wireless communications with the UE during the active time period. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
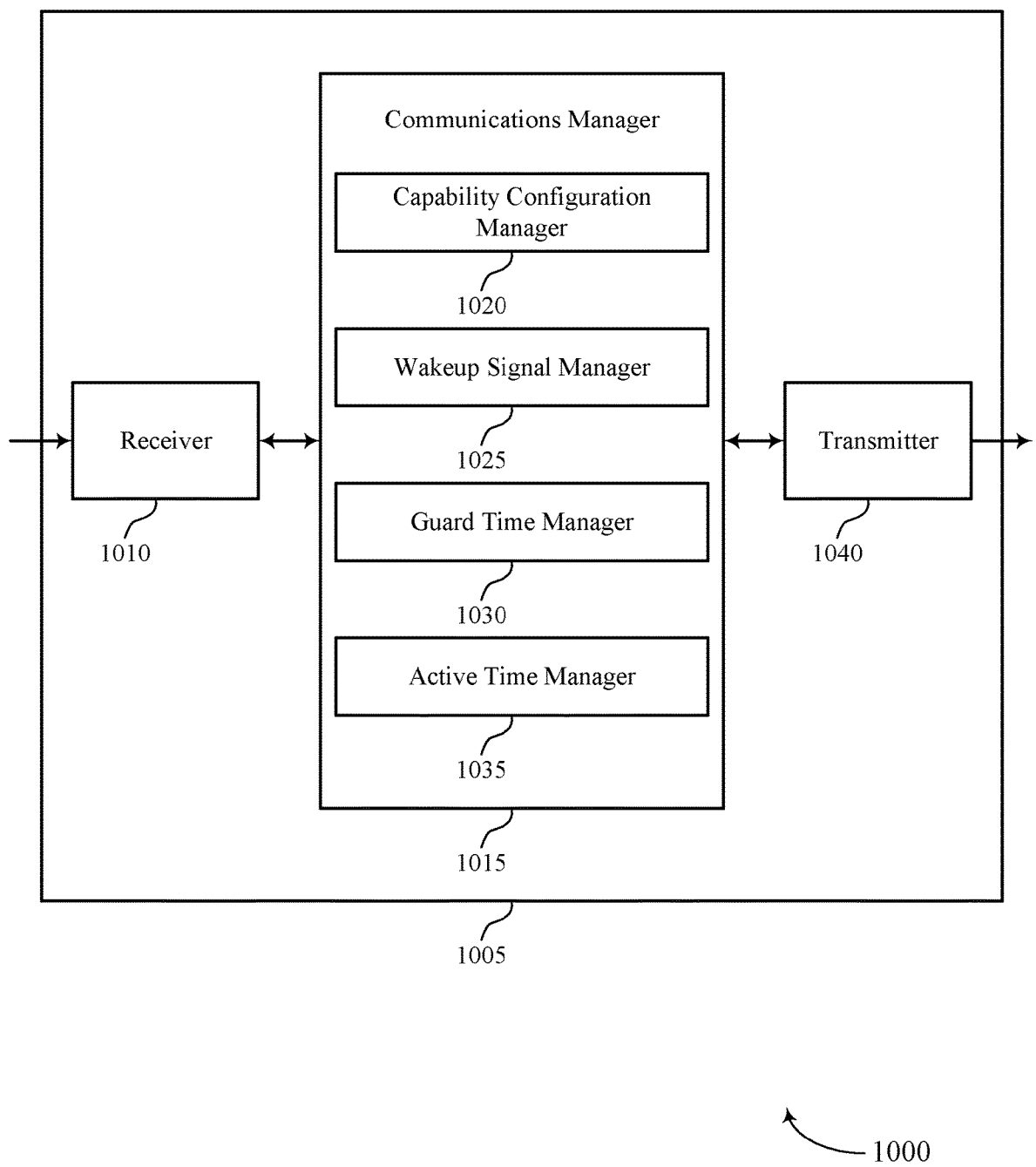

FIG. 10 shows a block diagram 1000 of a device 1005 that supports wakeup signaling for unlicensed bands in accordance with aspects of the present disclosure. The device 1005 may be an example of aspects of a device 905, or a base station 105 as described herein. The device 1005 may include a receiver 1010, a communications manager 1015, and a transmitter 1040. The device 1005 may also include a processor. Each of these components may be in communication with one another (e.g., via one or more buses).

The receiver 1010 may receive information such as packets, user data, or control information associated with various information channels (e.g., control channels, data channels, and information related to wakeup signaling for unlicensed bands, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a capability configuration manager 1020, a wakeup signal manager 1025, a guard time manager 1030, and an active time manager 1035. The communications manager 1015 may be an example of aspects of the communications manager 1210 described herein.

The capability configuration manager 1020 may receive a signal from a UE indicating a UE capability configuration.

The wakeup signal manager 1025 may transmit, over an unlicensed radio frequency spectrum band, a wakeup signal during a monitoring period, the wakeup signal indicating that wireless communications are to be performed between the UE and the base station during an active time period.

The guard time manager 1030 may identify a guard time period for the UE associated with the transmission of the wakeup signal, the guard time period is based on the UE capability configuration.

The active time manager 1035 may perform, after an expiration of the guard time period, the wireless communications with the UE during the active time period.

The transmitter 1040 may transmit signals generated by other components of the device 1005. In some examples, the transmitter 1040 may be collocated with a receiver 1010 in a transceiver module. For example, the transmitter 1040 may be an example of aspects of the transceiver 1220 described with reference to FIG. 12. The transmitter 1040 may utilize a single antenna or a set of antennas.

Figure 11:
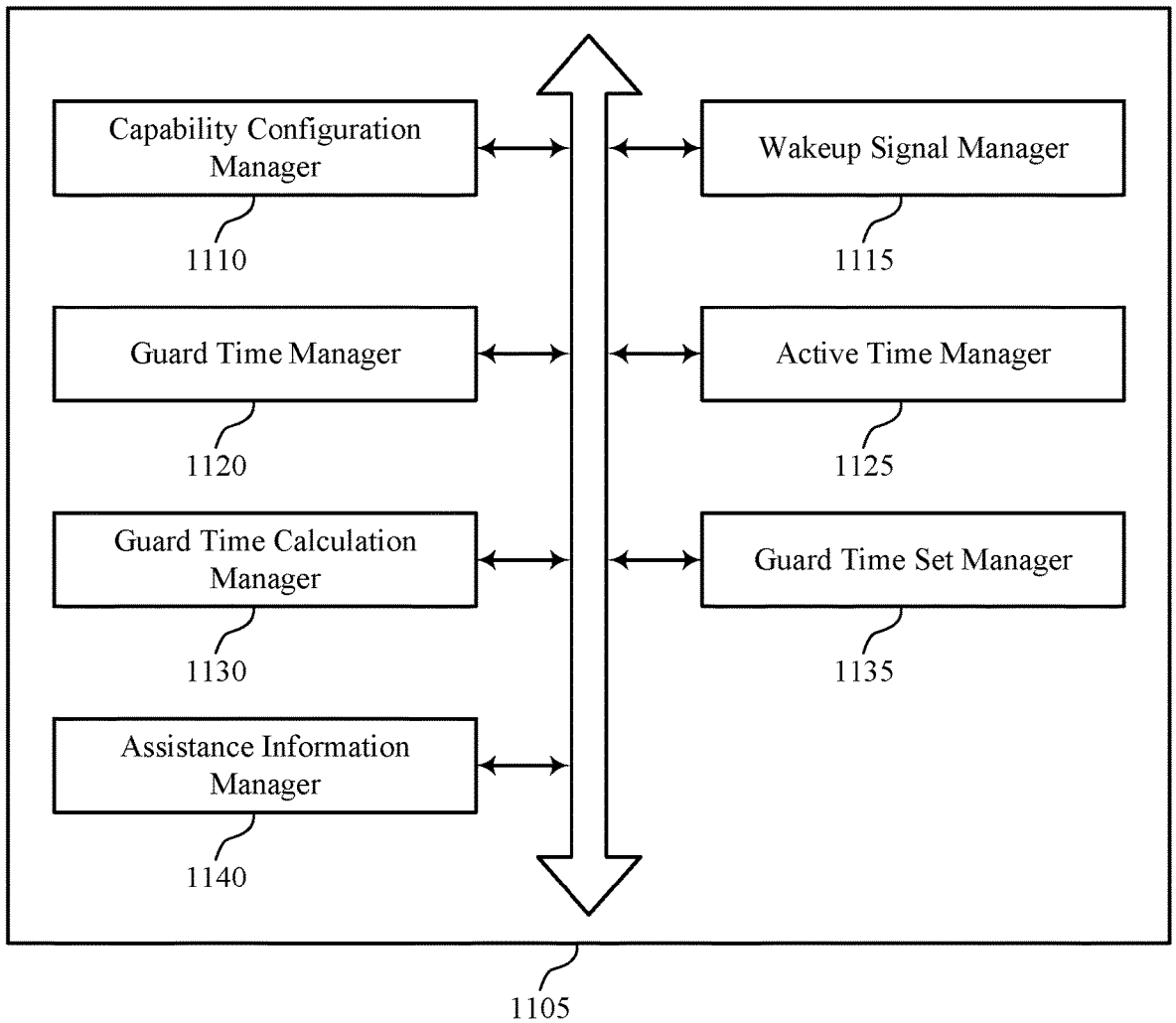
FIG. 11 shows a block diagram of a communications manager that supports wakeup signaling for unlicensed bands in accordance with aspects of the present disclosure.

FIG. 11 shows a block diagram 1100 of a communications manager 1105 that supports wakeup signaling for unlicensed bands in accordance with aspects of the present disclosure. The communications manager 1105 may be an example of aspects of a communications manager 915, a communications manager 1015, or a communications manager 1210 described herein. The communications manager 1105 may include a capability configuration manager 1110, a wakeup signal manager 1115, a guard time manager 1120, an active time manager 1125, a guard time calculation manager 1130, a guard time set manager 1135, and an assistance information manager 1140. Each of these modules may communicate, directly or indirectly, with one another (e.g., via one or more buses).

The capability configuration manager 1110 may receive a signal from a UE indicating a UE capability configuration.

The wakeup signal manager 1115 may transmit, over an unlicensed radio frequency spectrum band, a wakeup signal during a monitoring period, the wakeup signal indicating that wireless communications are to be performed between the UE and the base station during an active time period.

The guard time manager 1120 may identify a guard time period for the UE associated with the transmission of the wakeup signal, the guard time period is based on the UE capability configuration. In some cases, the monitoring period, the guard time period, and the active time period occur during an on duration of a connected mode discontinuous reception operation of the UE. In some cases, the monitoring period and the guard time period occur before on duration of a connected mode discontinuous reception operation of the UE. In some cases, the active time period includes the on duration.

The active time manager 1125 may perform, after an expiration of the guard time period, the wireless communications with the UE during the active time period. In some examples, the active time manager 1125 may refrain from transmitting signal to the UE during the guard time period.

The guard time calculation manager 1130 may determine, based on a transmission time of the wakeup signal, a start time for the active time period of the UE.

The guard time set manager 1135 may select the guard time period from a set of available guard time periods configured for the UE. In some cases, the guard time period is autonomously selected from the set of available guard time periods. In some cases, the guard time period is selected from the set of available guard time periods based on a channel performance metric for the unlicensed radio frequency spectrum band. In some cases, the guard time period is selected from the set of available guard time periods based on an indication conveyed in at least one of the wakeup signal, a RRC signal, a MAC CE, or a combination thereof.

The assistance information manager 1140 may receive a UE assistance request signal from the UE, where the guard time period is based on the UE assistance request signal.

Figure 12:
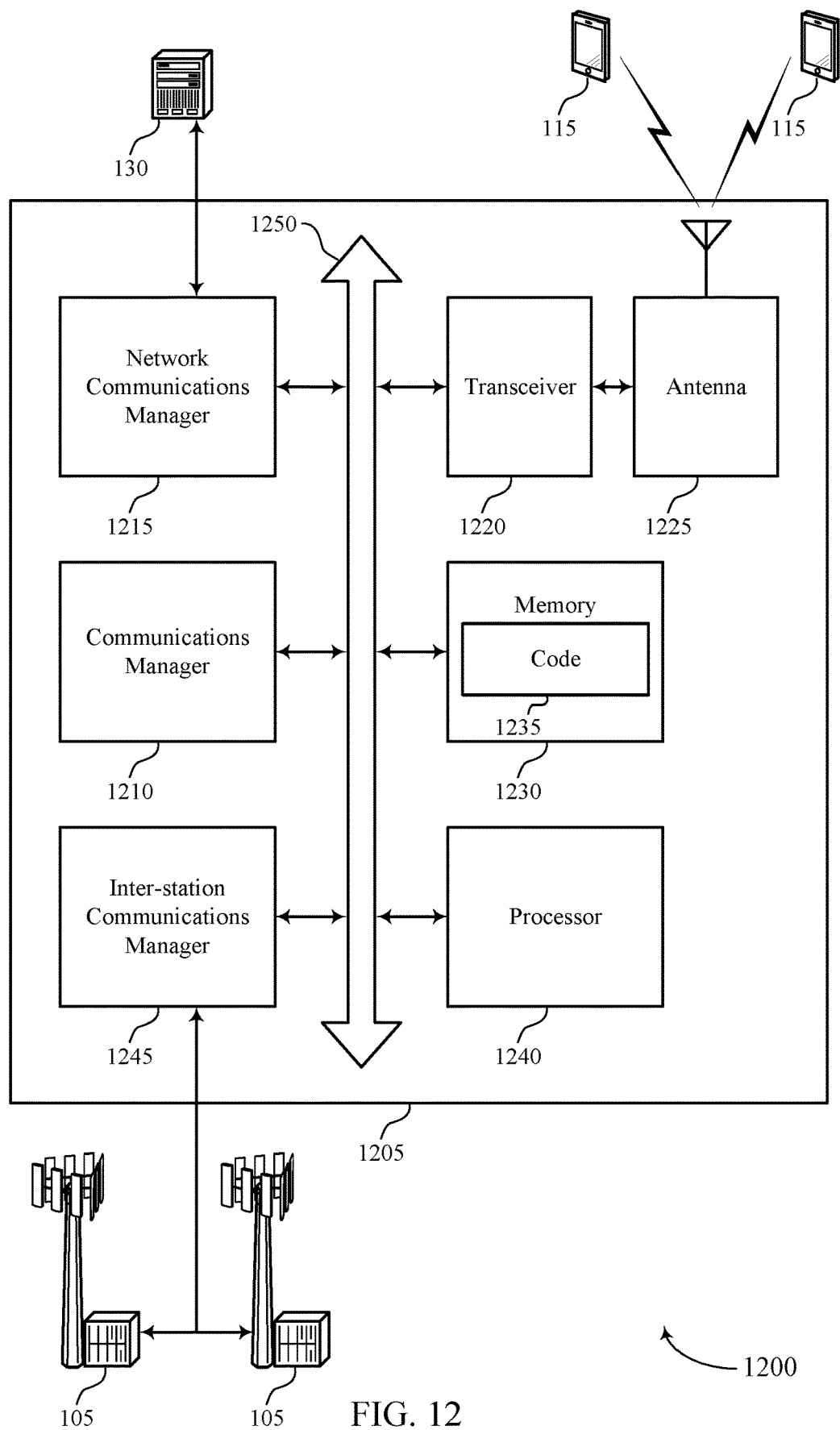
FIG. 12 shows a diagram of a system including a device that supports wakeup signaling for unlicensed bands in accordance with aspects of the present disclosure.

FIG. 12 shows a diagram of a system 1200 including a device 1205 that supports wakeup signaling for unlicensed bands in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive a signal from a UE indicating a UE capability configuration, transmit, over an unlicensed radio frequency spectrum band, a wakeup signal during a monitoring period, the wakeup signal indicating that wireless communications are to be performed between the UE and the base station during an active time period, identify a guard time period for the UE associated with the transmission of the wakeup signal, the guard time period is based on the UE capability configuration, and perform, after an expiration of the guard time period, the wireless communications with the UE during the active time period.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting wakeup signaling for unlicensed bands).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
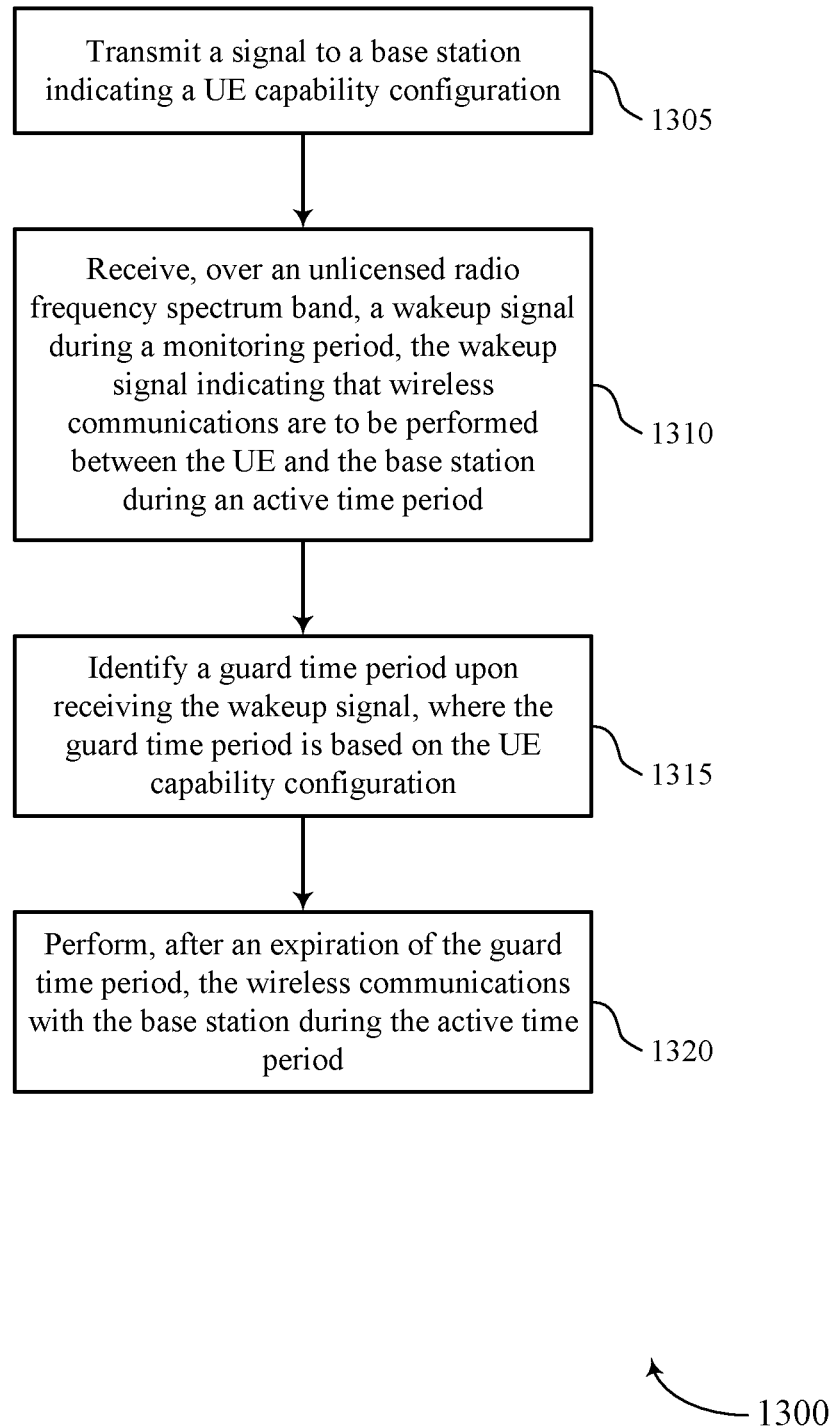
FIGS. 13 through 17 show flowcharts illustrating methods that support wakeup signaling for unlicensed bands in accordance with aspects of the present disclosure.

FIG. 13 shows a flowchart illustrating a method 1300 that supports wakeup signaling for unlicensed bands in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit a signal to a base station indicating a UE capability configuration. The operations of 1305 may be performed according to the methods described herein. In some examples, aspects of the operations of 1305 may be performed by a capability configuration manager as described with reference to FIGS. 5 through 8.

At 1310, the UE may receive, over an unlicensed radio frequency spectrum band, a wakeup signal during a monitoring period, the wakeup signal indicating that wireless communications are to be performed between the UE and the base station during an active time period. The operations of 1310 may be performed according to the methods described herein. In some examples, aspects of the operations of 1310 may be performed by a wakeup signal manager as described with reference to FIGS. 5 through 8.

At 1315, the UE may identify a guard time period upon receiving the wakeup signal, where the guard time period is based on the UE capability configuration. The operations of 1315 may be performed according to the methods described herein. In some examples, aspects of the operations of 1315 may be performed by a guard time manager as described with reference to FIGS. 5 through 8.

At 1320, the UE may perform, after an expiration of the guard time period, the wireless communications with the base station during the active time period. The operations of 1320 may be performed according to the methods described herein. In some examples, aspects of the operations of 1320 may be performed by an active time manager as described with reference to FIGS. 5 through 8.

Figure 14:
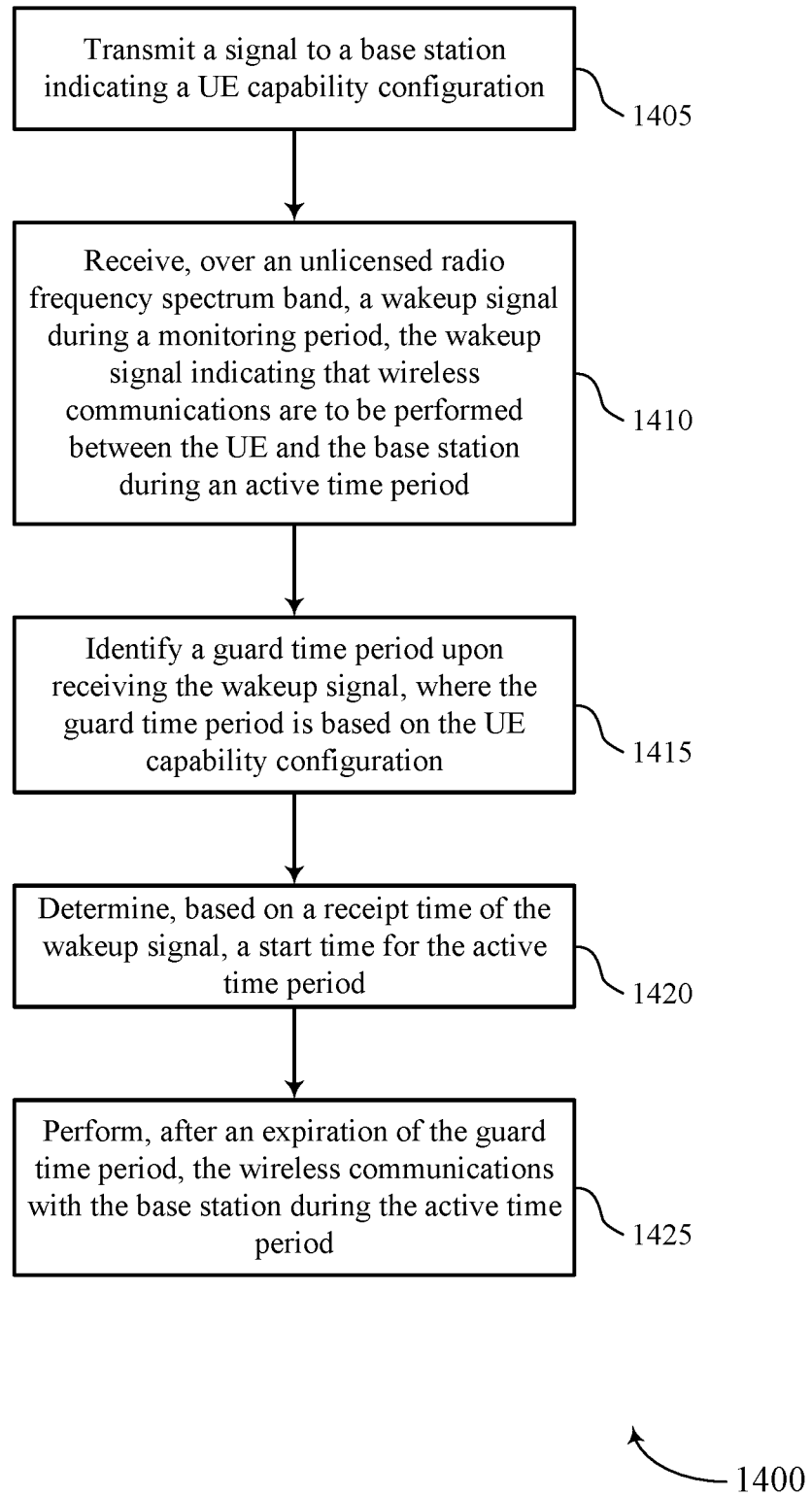

FIG. 14 shows a flowchart illustrating a method 1400 that supports wakeup signaling for unlicensed bands in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit a signal to a base station indicating a UE capability configuration. The operations of 1405 may be performed according to the methods described herein. In some examples, aspects of the operations of 1405 may be performed by a capability configuration manager as described with reference to FIGS. 5 through 8.

At 1410, the UE may receive, over an unlicensed radio frequency spectrum band, a wakeup signal during a monitoring period, the wakeup signal indicating that wireless communications are to be performed between the UE and the base station during an active time period. The operations of 1410 may be performed according to the methods described herein. In some examples, aspects of the operations of 1410 may be performed by a wakeup signal manager as described with reference to FIGS. 5 through 8.

At 1415, the UE may identify a guard time period upon receiving the wakeup signal, where the guard time period is based on the UE capability configuration. The operations of 1415 may be performed according to the methods described herein. In some examples, aspects of the operations of 1415 may be performed by a guard time manager as described with reference to FIGS. 5 through 8.

At 1420, the UE may determine, based on a receipt time of the wakeup signal, a start time for the active time period. The operations of 1420 may be performed according to the methods described herein. In some examples, aspects of the operations of 1420 may be performed by a guard time calculation manager as described with reference to FIGS. 5 through 8.

At 1425, the UE may perform, after an expiration of the guard time period, the wireless communications with the base station during the active time period. The operations of 1425 may be performed according to the methods described herein. In some examples, aspects of the operations of 1425 may be performed by an active time manager as described with reference to FIGS. 5 through 8.

Figure 15:
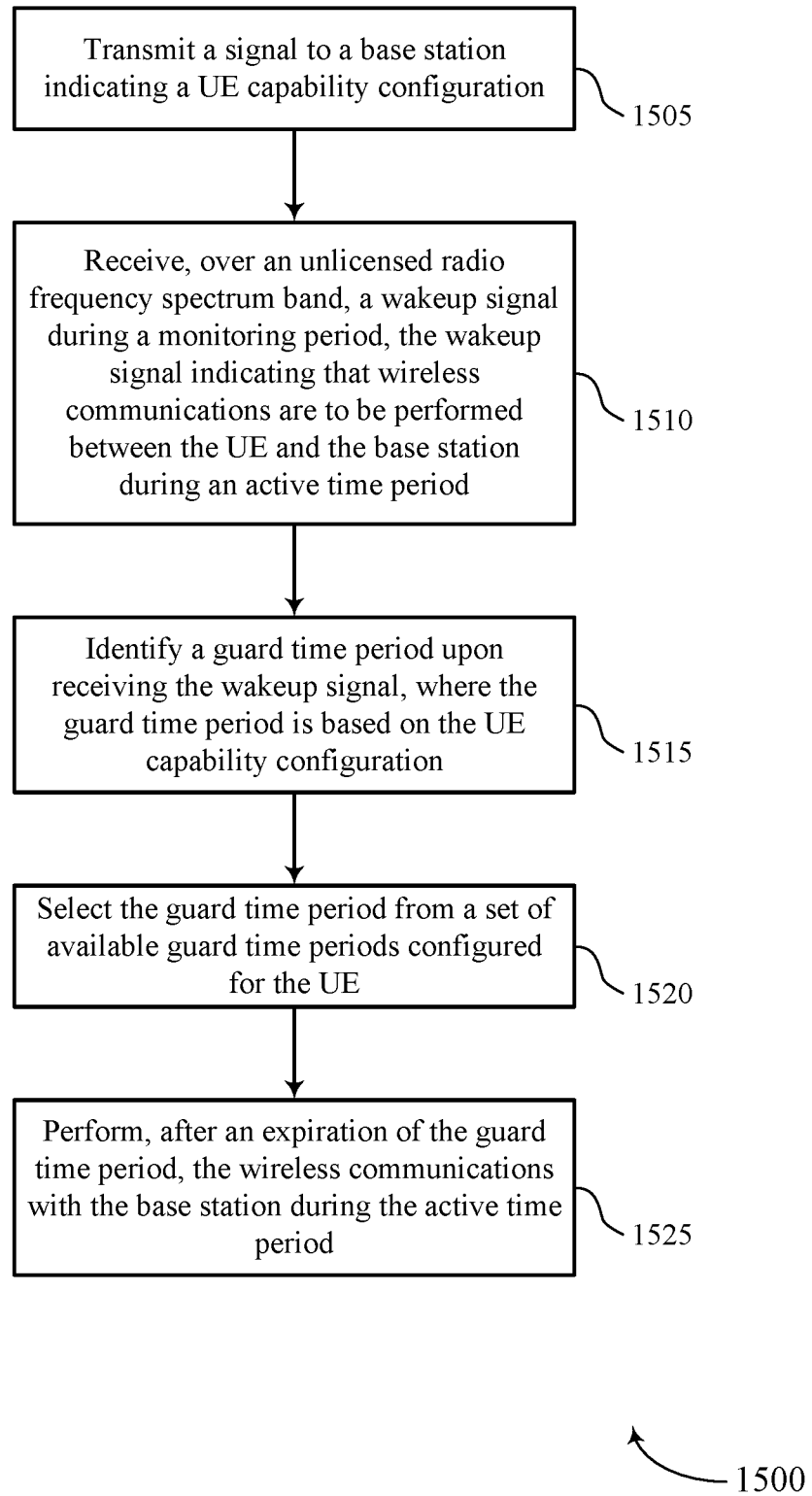

FIG. 15 shows a flowchart illustrating a method 1500 that supports wakeup signaling for unlicensed bands in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1505, the UE may transmit a signal to a base station indicating a UE capability configuration. The operations of 1505 may be performed according to the methods described herein. In some examples, aspects of the operations of 1505 may be performed by a capability configuration manager as described with reference to FIGS. 5 through 8.

At 1510, the UE may receive, over an unlicensed radio frequency spectrum band, a wakeup signal during a monitoring period, the wakeup signal indicating that wireless communications are to be performed between the UE and the base station during an active time period. The operations of 1510 may be performed according to the methods described herein. In some examples, aspects of the operations of 1510 may be performed by a wakeup signal manager as described with reference to FIGS. 5 through 8.

At 1515, the UE may identify a guard time period upon receiving the wakeup signal, where the guard time period is based on the UE capability configuration. The operations of 1515 may be performed according to the methods described herein. In some examples, aspects of the operations of 1515 may be performed by a guard time manager as described with reference to FIGS. 5 through 8.

At 1520, the UE may select the guard time period from a set of available guard time periods configured for the UE. The operations of 1520 may be performed according to the methods described herein. In some examples, aspects of the operations of 1520 may be performed by a guard time set manager as described with reference to FIGS. 5 through 8.

At 1525, the UE may perform, after an expiration of the guard time period, the wireless communications with the base station during the active time period. The operations of 1525 may be performed according to the methods described herein. In some examples, aspects of the operations of 1525 may be performed by an active time manager as described with reference to FIGS. 5 through 8.

Figure 16:
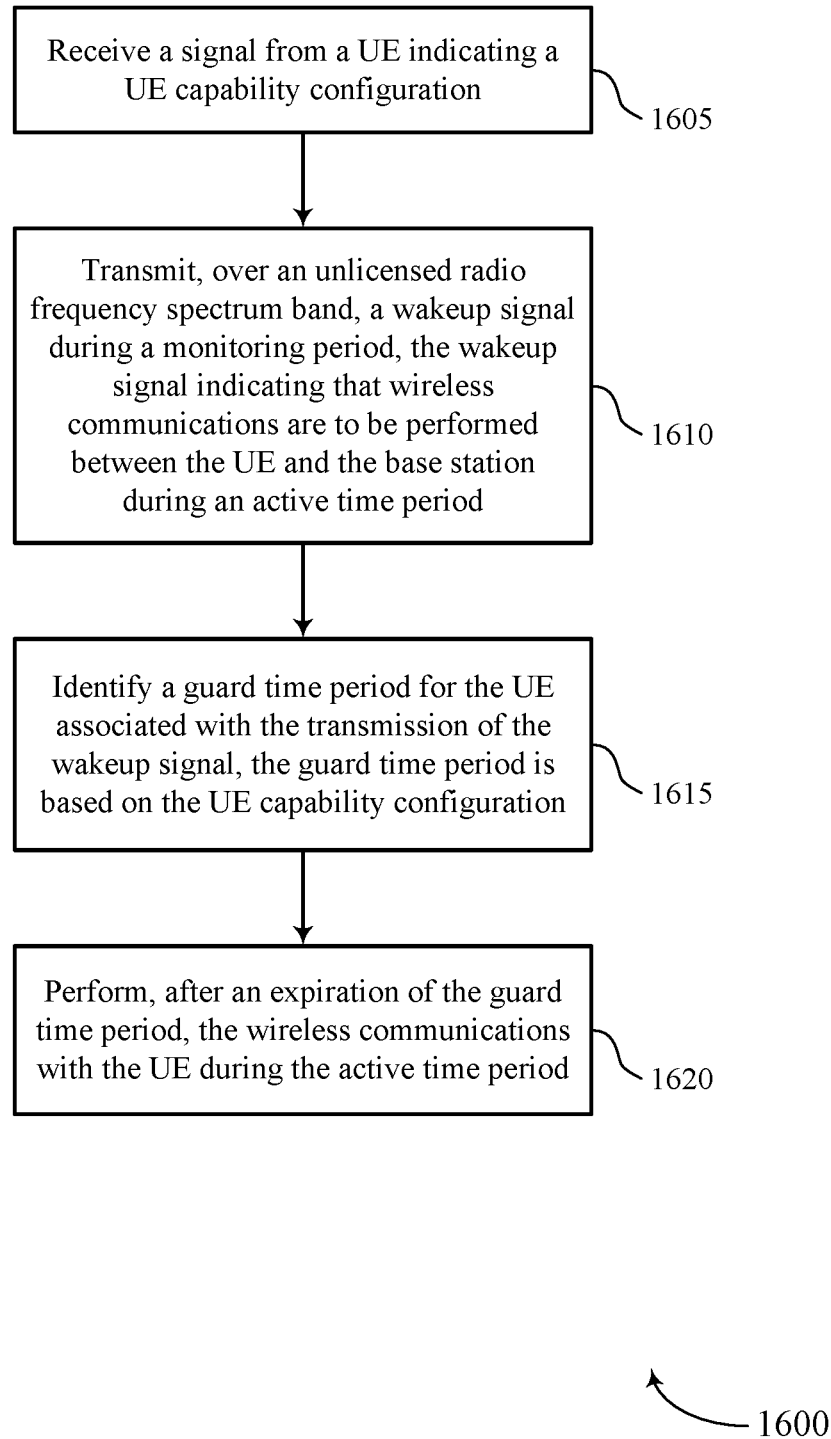

FIG. 16 shows a flowchart illustrating a method 1600 that supports wakeup signaling for unlicensed bands in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1605, the base station may receive a signal from a UE indicating a UE capability configuration. The operations of 1605 may be performed according to the methods described herein. In some examples, aspects of the operations of 1605 may be performed by a capability configuration manager as described with reference to FIGS. 9 through 12.

At 1610, the base station may transmit, over an unlicensed radio frequency spectrum band, a wakeup signal during a monitoring period, the wakeup signal indicating that wireless communications are to be performed between the UE and the base station during an active time period. The operations of 1610 may be performed according to the methods described herein. In some examples, aspects of the operations of 1610 may be performed by a wakeup signal manager as described with reference to FIGS. 9 through 12.

At 1615, the base station may identify a guard time period for the UE associated with the transmission of the wakeup signal, the guard time period is based on the UE capability configuration. The operations of 1615 may be performed according to the methods described herein. In some examples, aspects of the operations of 1615 may be performed by a guard time manager as described with reference to FIGS. 9 through 12.

At 1620, the base station may perform, after an expiration of the guard time period, the wireless communications with the UE during the active time period. The operations of 1620 may be performed according to the methods described herein. In some examples, aspects of the operations of 1620 may be performed by an active time manager as described with reference to FIGS. 9 through 12.

Figure 17:
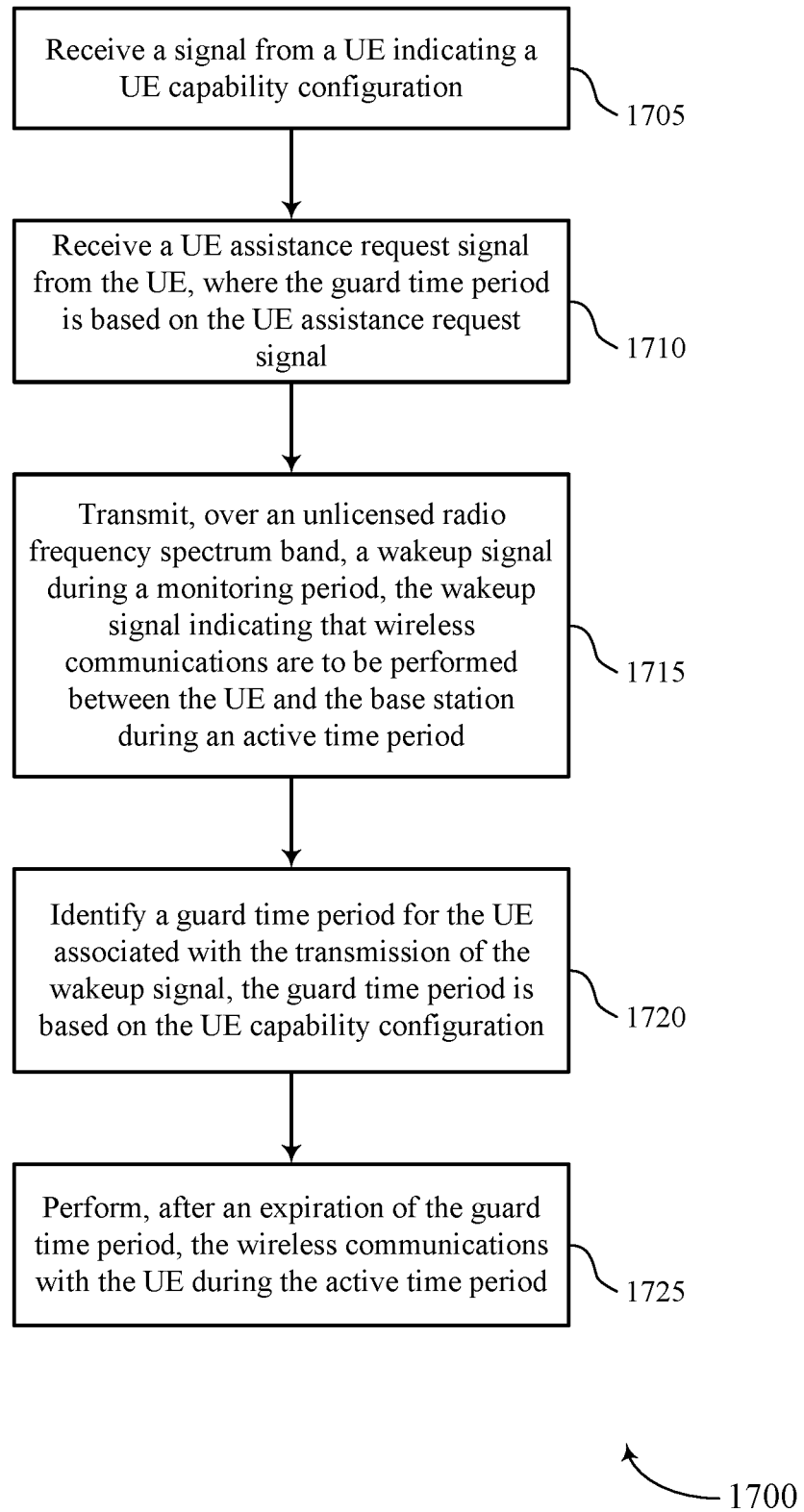

FIG. 17 shows a flowchart illustrating a method 1700 that supports wakeup signaling for unlicensed bands in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1705, the base station may receive a signal from a UE indicating a UE capability configuration. The operations of 1705 may be performed according to the methods described herein. In some examples, aspects of the operations of 1705 may be performed by a capability configuration manager as described with reference to FIGS. 9 through 12.

At 1710, the base station may receive a UE assistance request signal from the UE, where the guard time period is based on the UE assistance request signal. The operations of 1710 may be performed according to the methods described herein. In some examples, aspects of the operations of 1710 may be performed by an assistance information manager as described with reference to FIGS. 9 through 12.

At 1715, the base station may transmit, over an unlicensed radio frequency spectrum band, a wakeup signal during a monitoring period, the wakeup signal indicating that wireless communications are to be performed between the UE and the base station during an active time period. The operations of 1715 may be performed according to the methods described herein. In some examples, aspects of the operations of 1715 may be performed by a wakeup signal manager as described with reference to FIGS. 9 through 12.

At 1720, the base station may identify a guard time period for the UE associated with the transmission of the wakeup signal, the guard time period is based on the UE capability configuration. The operations of 1720 may be performed according to the methods described herein. In some examples, aspects of the operations of 1720 may be performed by a guard time manager as described with reference to FIGS. 9 through 12.

At 1725, the base station may perform, after an expiration of the guard time period, the wireless communications with the UE during the active time period. The operations of 1725 may be performed according to the methods described herein. In some examples, aspects of the operations of 1725 may be performed by an active time manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
   transmitting a signal to a base station indicating a UE capability configuration;
   transmitting a UE assistance information to the base station;
   receiving, over an unlicensed radio frequency spectrum band, a wakeup signal during a monitoring period, the wakeup signal indicating that wireless communications are to be performed between the UE and the base station during an active time period;
   identifying a guard time period upon receiving the wakeup signal, wherein the guard time period is based at least in part on the UE capability configuration and the UE assistance information; and
   performing, after an expiration of the guard time period, the wireless communications with the base station during the active time period.

2. The method of claim 1, further comprising:
   determining, based at least in part on a receipt time of the wakeup signal, a start time for the active time period.

3. The method of claim 1, further comprising:
   selecting the guard time period from a set of available guard time periods configured for the UE.

4. The method of claim 3, wherein the guard time period is autonomously selected from the set of available guard time periods.

5. The method of claim 3, wherein the guard time period is selected from the set of available guard time periods based at least in part on a channel performance metric for the unlicensed radio frequency spectrum band.

6. The method of claim 3, wherein the guard time period is selected from the set of available guard time periods based at least in part on an indication conveyed in at least one of the wakeup signal, a radio resource control (RRC) signal, a medium access control (MAC) control element (CE), or a combination thereof.

7. The method of claim 1, further comprising:
   refraining from communicating with the base station during the guard time period.

8. The method of claim 1, wherein the monitoring period, the guard time period, and the active time period occur during an on duration of a connected mode discontinuous reception operation of the UE.

9. The method of claim 1, wherein:
   the monitoring period and the guard time period occur before an on duration of a connected mode discontinuous reception operation of the UE; and
   the active time period comprises the on duration.

10. A method for wireless communications at a base station, comprising:
    receiving a signal from a user equipment (UE) indicating a UE capability configuration;
    receiving a UE assistance request signal from the UE;
    transmitting, over an unlicensed radio frequency spectrum band, a wakeup signal during a monitoring period, the wakeup signal indicating that wireless communications are to be performed between the UE and the base station during an active time period;
    identifying a guard time period for the UE associated with the transmission of the wakeup signal, the guard time period is based at least in part on the UE capability configuration and the UE assistance request signal; and
    performing, after an expiration of the guard time period, the wireless communications with the UE during the active time period.

11. The method of claim 10, further comprising:
    determining, based at least in part on a transmission time of the wakeup signal, a start time for the active time period of the UE.

12. The method of claim 10, further comprising:
    selecting the guard time period from a set of available guard time periods configured for the UE.

13. The method of claim 12, wherein the guard time period is autonomously selected from the set of available guard time periods.

14. The method of claim 12, wherein the guard time period is selected from the set of available guard time periods based at least in part on a channel performance metric for the unlicensed radio frequency spectrum band.

15. The method of claim 12, wherein the guard time period is selected from the set of available guard time periods based at least in part on an indication conveyed in at least one of the wakeup signal, a radio resource control (RRC) signal, a medium access control (MAC) control element (CE), or a combination thereof.

16. The method of claim 10, further comprising:
refraining from communicating with the UE during the guard time period.

17. The method of claim 10, wherein the monitoring period, the guard time period, and the active time period occur during an on duration of a connected mode discontinuous reception operation of the UE.

18. The method of claim 10, wherein:
the monitoring period and the guard time period occur before an on duration of a connected mode discontinuous reception operation of the UE; and
the active time period comprises the on duration.

19. An apparatus for wireless communications at a user equipment (UE), comprising: a processor, memory in electronic communication with the processor; and instructions stored in the memory and executable by the processor to cause the apparatus to:
transmit a signal to a base station indicating a UE capability configuration;
transmit a UE assistance information to the base station;
receive, over an unlicensed radio frequency spectrum band, a wakeup signal during a monitoring period, the wakeup signal indicating that the wireless communications are to be performed between the UE and the base station during an active time period;
identify a guard time period upon receiving the wakeup signal, wherein the guard time period is based at least in part on the UE capability configuration and the UE assistance information; and
perform, after an expiration of the guard time period, the wireless communications with the base station during the active time period.

20. The apparatus of claim 19, wherein the instructions are further executable by the processor to cause the apparatus to:
determine, based at least in part on a receipt time of the wakeup signal, a start time for the active time period.

21. The apparatus of claim 19, wherein the instructions are further executable by the processor to cause the apparatus to:
select the guard time period from a set of available guard time periods configured for the UE.

22. The apparatus of claim 21, wherein the guard time period is autonomously selected from the set of available guard time periods.

23. The apparatus of claim 21, wherein the guard time period is selected from the set of available guard time periods based at least in part on a channel performance metric for the unlicensed radio frequency spectrum band.

24. The apparatus of claim 21, wherein the guard time period is selected from the set of available guard time periods based at least in part on an indication conveyed in at least one of the wakeup signal, a radio resource control (RRC) signal, a medium access control (MAC) control element (CE), or a combination thereof.

25. An apparatus for wireless communications at a base station, comprising: a processor, memory in electronic communication with the processor; and instructions stored in the memory and executable by the processor to cause the apparatus to:
receive a signal from a user equipment (UE) indicating a UE capability configuration;
receive a UE assistance request signal from the UE;
transmit, over an unlicensed radio frequency spectrum band, a wakeup signal during a monitoring period, the wakeup signal indicating that the wireless communications are to be performed between the UE and the base station during an active time period;
identify a guard time period for the UE associated with the transmission of the wakeup signal, the guard time period is based at least in part on the UE capability configuration and the UE assistance request signal; and
perform, after an expiration of the guard time period, the wireless communications with the UE during the active time period.

26. The apparatus of claim 25, wherein the instructions are further executable by the processor to cause the apparatus to:
determine, based at least in part on a transmission time of the wakeup signal, a start time for the active time period of the UE.

27. The apparatus of claim 25, wherein the instructions are further executable by the processor to cause the apparatus to:
select the guard time period from a set of available guard time periods configured for the UE.

28. The apparatus of claim 27, wherein the guard time period is autonomously selected from the set of available guard time periods.

* * * * *